(12) United States Patent
Sasaki et al.

(10) Patent No.: US 11,446,668 B2
(45) Date of Patent: Sep. 20, 2022

(54) AUTOMATIC ANALYSIS DEVICE

(71) Applicant: HITACHI HIGH-TECH CORPORATION, Tokyo (JP)

(72) Inventors: Shunsuke Sasaki, Tokyo (JP); Takenori Okusa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 268 days.

(21) Appl. No.: 16/633,067

(22) PCT Filed: Jun. 29, 2018

(86) PCT No.: PCT/JP2018/024799
§ 371 (c)(1),
(2) Date: Jan. 22, 2020

(87) PCT Pub. No.: WO2019/026498
PCT Pub. Date: Feb. 7, 2019

(65) Prior Publication Data
US 2020/0164377 A1 May 28, 2020

(30) Foreign Application Priority Data
Aug. 1, 2017 (JP) .............................. JP2017-149246

(51) Int. Cl.
*B01L 3/00* (2006.01)
*G01N 35/10* (2006.01)
(Continued)

(52) U.S. Cl.
CPC .............. *B01L 3/52* (2013.01); *G01N 35/025* (2013.01); *G01N 35/1002* (2013.01); *G01N 31/00* (2013.01); *G01N 35/00* (2013.01)

(58) Field of Classification Search
CPC .. G01N 35/025; G01N 35/1002; G01N 31/00; G01N 35/00; G01N 2035/00306;
(Continued)

(56) References Cited

U.S. PATENT DOCUMENTS 6,003,531 A 12/1999 Kimura et al.
6,815,198 B2 11/2004 Nemoto et al.
(Continued)

FOREIGN PATENT DOCUMENTS

JP H0365654 A 3/1991
JP H4166768 A 6/1992
(Continued)

OTHER PUBLICATIONS

European Search Report for related European Patent Application No. 12742716.9-1553 (dated May 25, 2016).
(Continued)

*Primary Examiner* — Benjamin R Whatley
*Assistant Examiner* — Curtis A Thompson
(74) *Attorney, Agent, or Firm* — Miles & Stockbridge, P.C.

(57) ABSTRACT

An automatic analysis device which can be accessed from a front surface of the device to a rear surface side of the device when a user accesses the automatic analysis device and reduce the risk of damage to a rod-shaped member due to contact. A reagent suction position, a reagent discharge position, a reagent dispensing nozzle cleaning portion, and a reagent dispensing mechanism retraction portion from which the reagent dispensing mechanism is retracted are disposed on a trajectory of an arm of the reagent dispensing mechanism. A nozzle guide accommodation portion accommodates a nozzle guide of a reagent dispensing mechanism and the reagent dispensing nozzle. The reagent dispensing mechanism retraction portion is a cylindrical member pro-
(Continued)

truding downward from an upper surface cover of the automatic analysis device and prevents direct contact with the reagent dispensing nozzle by positioning the reagent dispensing nozzle in the nozzle accommodation portion.

14 Claims, 15 Drawing Sheets

(51) Int. Cl.
  *G01N 35/02* (2006.01)
  *G01N 31/00* (2006.01)
  *G01N 35/00* (2006.01)

(58) Field of Classification Search
  CPC ........... G01N 2035/1058; G01N 35/02; G01N 35/10; B01L 3/52
  See application file for complete search history.

(56) References Cited

U.S. PATENT DOCUMENTS

| | | | |
|---|---|---|---|
| 2002/0008033 A1 | 1/2002 | McGrath et al. | |
| 2008/0056942 A1 | 3/2008 | Arima et al. | |
| 2008/0311678 A1* | 12/2008 | Ootani | G01N 35/10 436/526 |
| 2010/0051060 A1 | 3/2010 | Kuroda et al. | |
| 2011/0053277 A1 | 3/2011 | Yamato et al. | |
| 2011/0104007 A1* | 5/2011 | Hirano | G01N 35/025 422/63 |
| 2011/0274584 A1 | 11/2011 | Kitamura et al. | |
| 2011/0293474 A1 | 12/2011 | Sugimura et al. | |
| 2012/0003731 A1 | 1/2012 | Kuroda | |
| 2012/0020838 A1 | 1/2012 | Mimura et al. | |
| 2012/0227771 A1 | 9/2012 | Waterbury et al. | |
| 2014/0037503 A1 | 2/2014 | Sakashita et al. | |
| 2016/0187365 A1* | 6/2016 | Yaita | G01N 35/1004 436/43 |

FOREIGN PATENT DOCUMENTS

| | | | |
|---|---|---|---|
| JP | H06207944 A | | 7/1994 |
| JP | H10062435 A | | 3/1998 |
| JP | 2002107341 A | | 4/2002 |
| JP | 2005241442 A | | 9/2005 |
| JP | 2009041961 A | | 2/2009 |
| JP | 2010085097 A | * | 4/2010 |
| JP | 2010085097 A | | 4/2010 |
| JP | 2010160078 A | * | 7/2010 |
| JP | 5357893 B2 | | 12/2013 |
| JP | 2013253993 A | * | 12/2013 |
| JP | 2013253993 A | | 12/2013 |
| JP | 5553554 B2 | | 7/2014 |
| JP | 2014228318 A | | 12/2014 |
| WO | 2010104072 A1 | | 9/2010 |
| WO | 2010117044 A1 | | 10/2010 |
| WO | 2012105398 A1 | | 8/2012 |

OTHER PUBLICATIONS

English translation of the International Preliminary Report on Patentability from International Application No. PCT/JP2012/051619, dated Aug. 6, 2013.
Search Report dated Apr. 8, 2021 in corresponding European Application No. 18 842 236.4.

* cited by examiner

[FIG. 1]
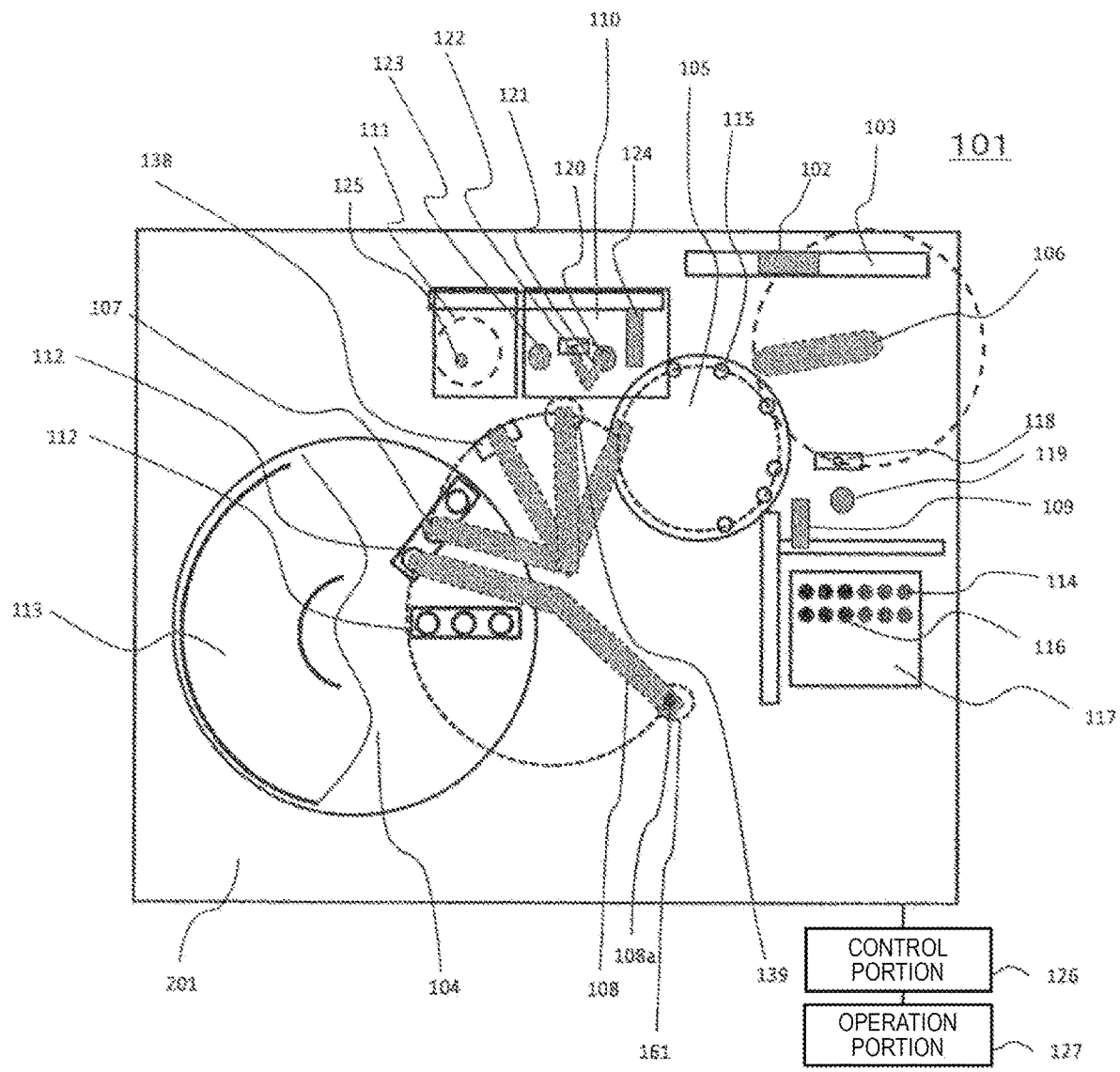

[Fig. 2]
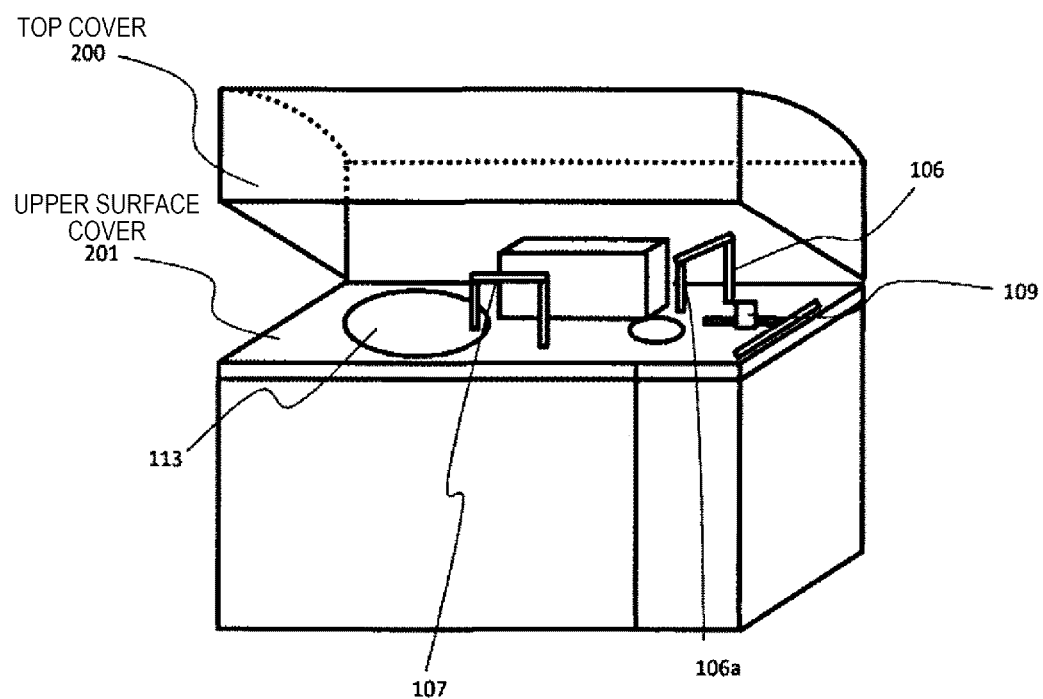

[Fig. 3]
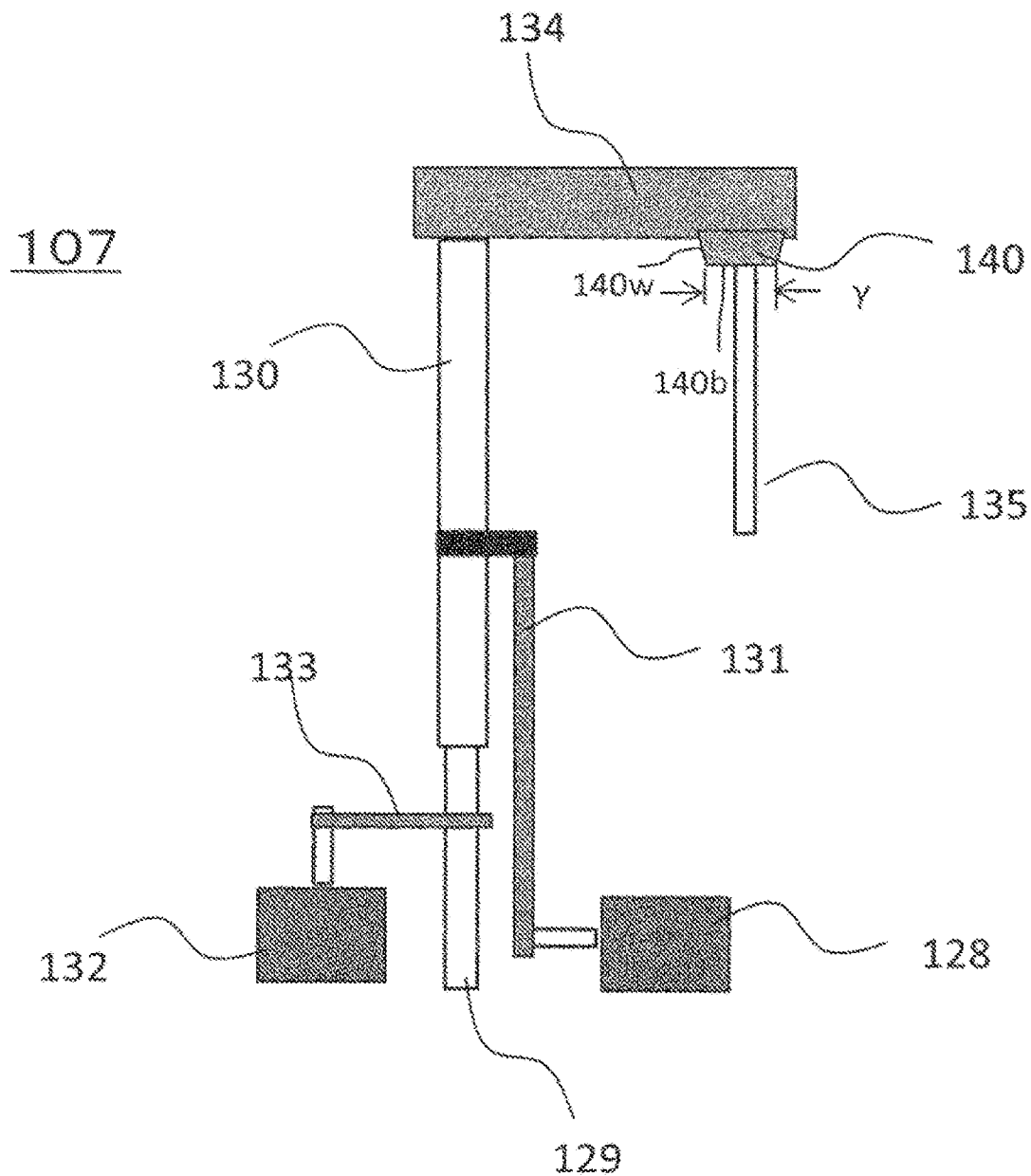

[Fig. 4]
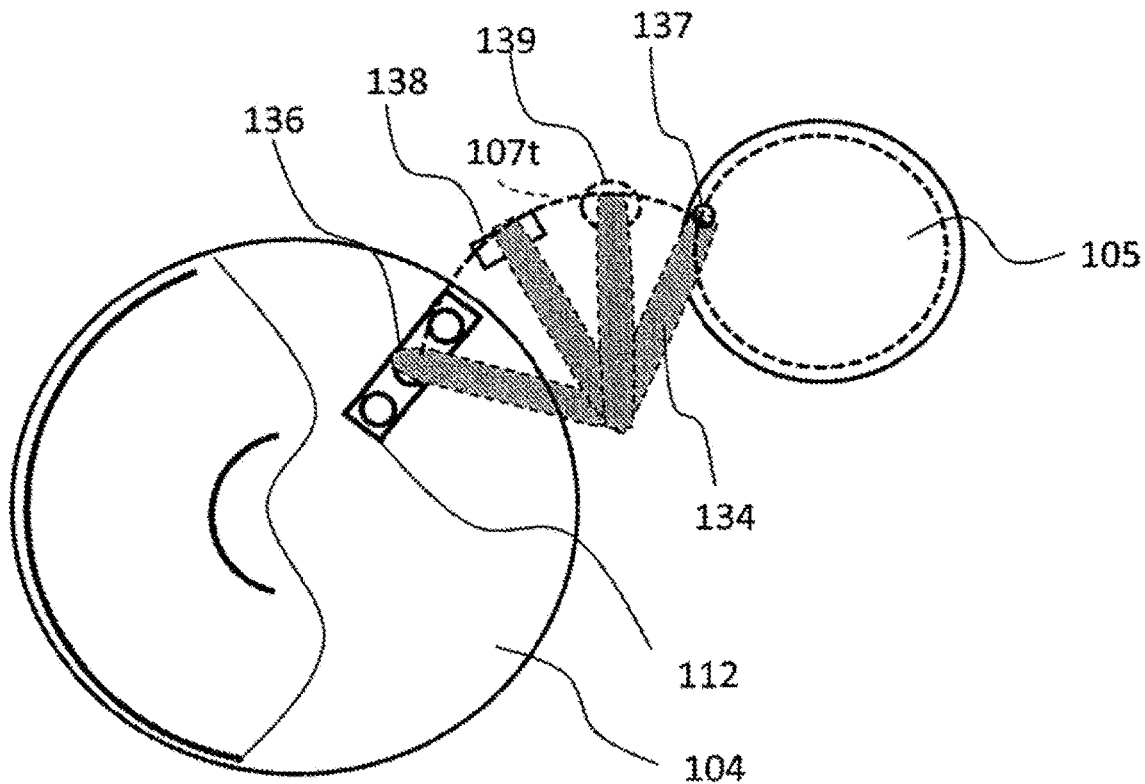
[Fig. 5]
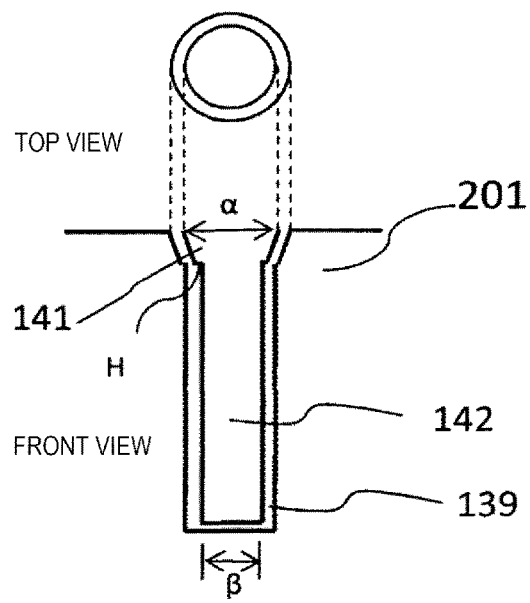

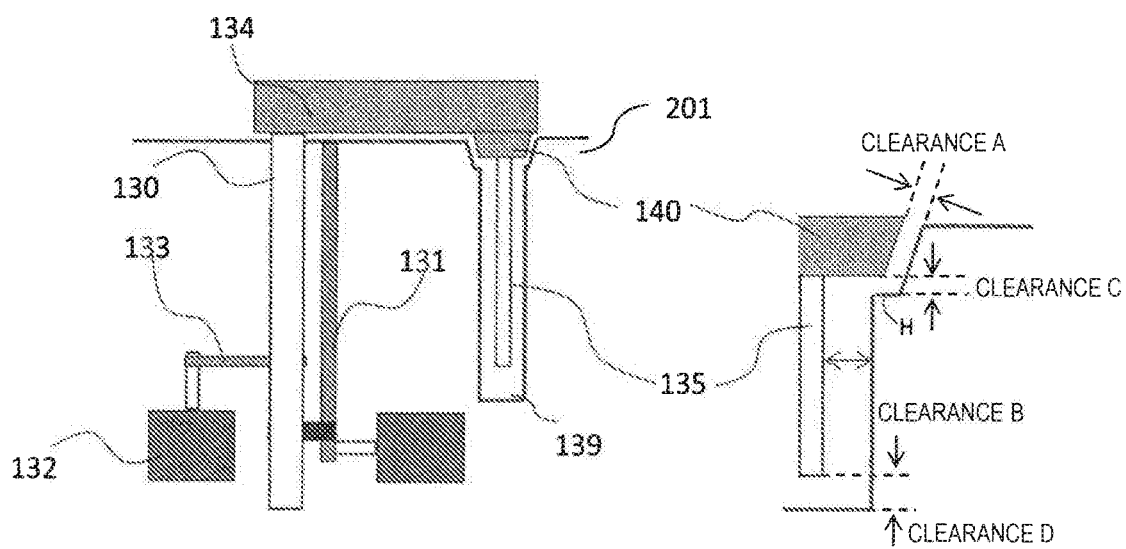
SCHEMATIC VIEW AT ACCOMMODATION OF
DISPENSING NOZZLE
[Fig. 6A]
ENLARGED VIEW OF NOZZLE GUIDE
[Fig. 6B]

[Fig. 7]
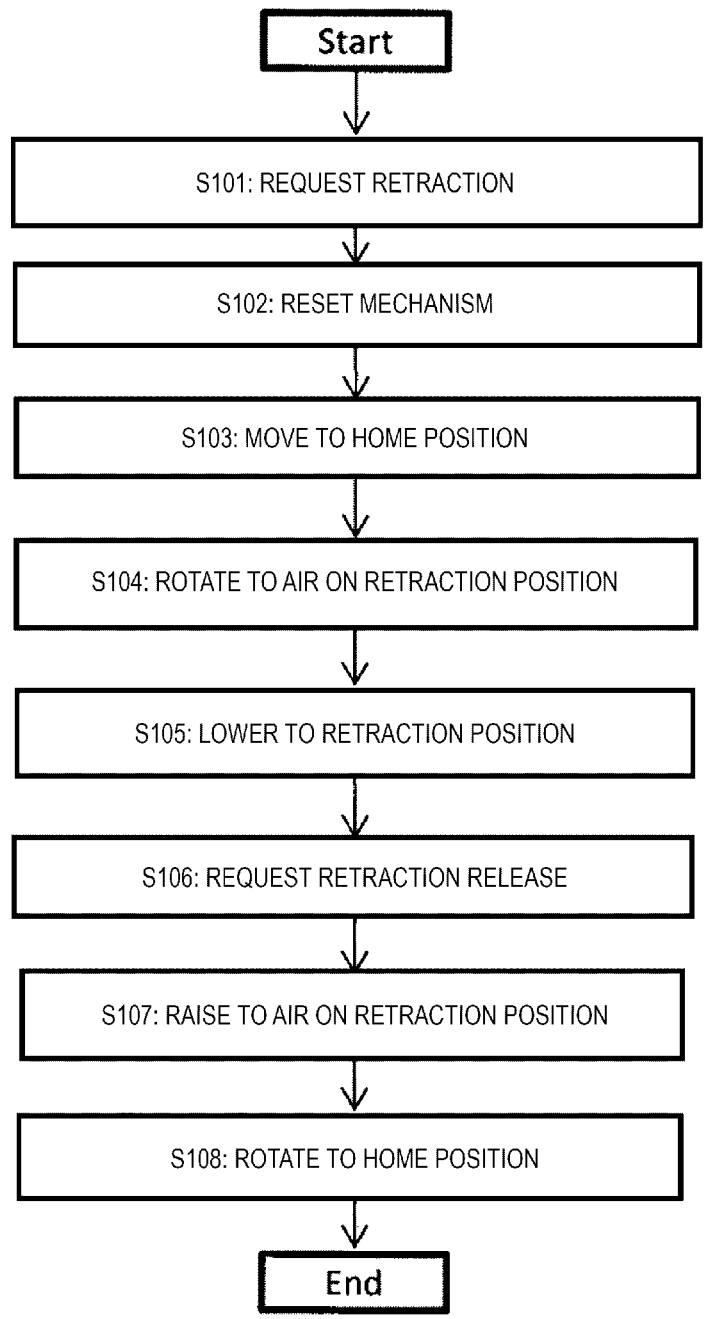

[Fig 8]
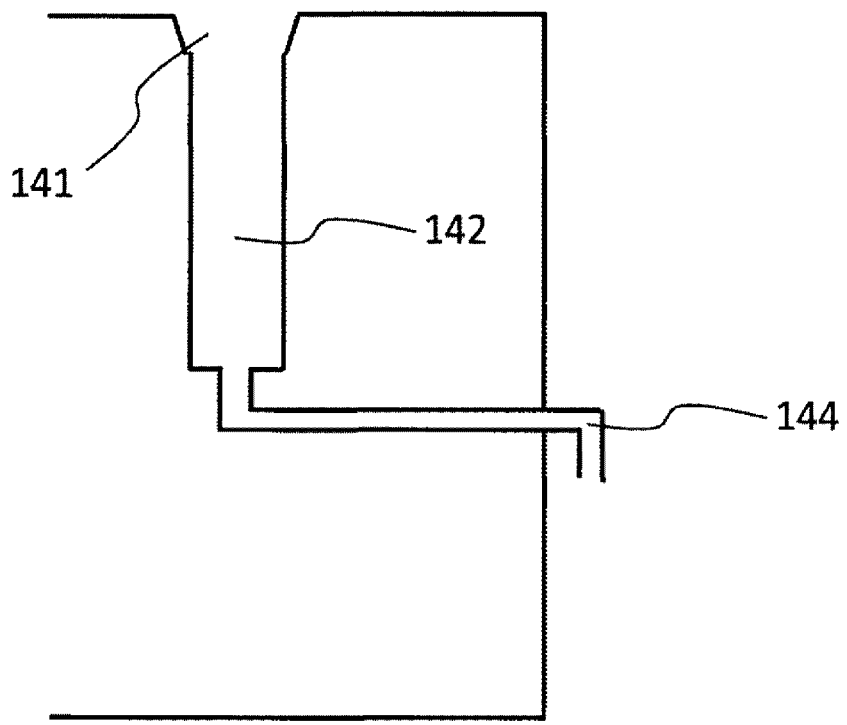
[Fig 9]
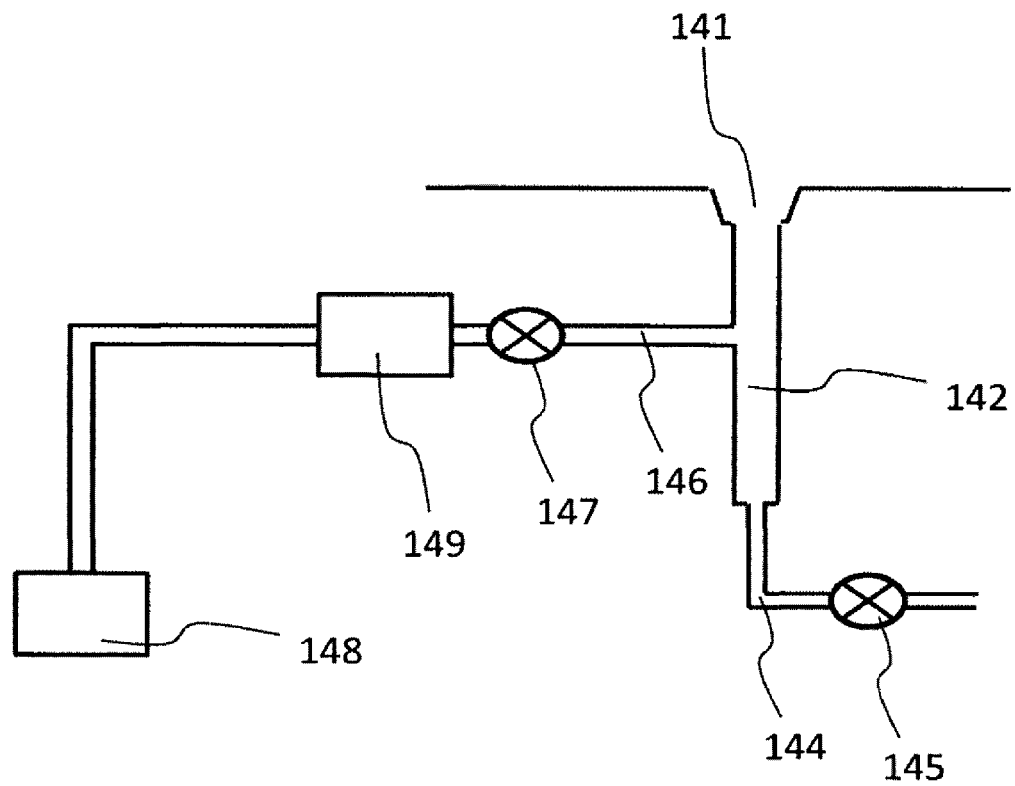

[Fig. 10]
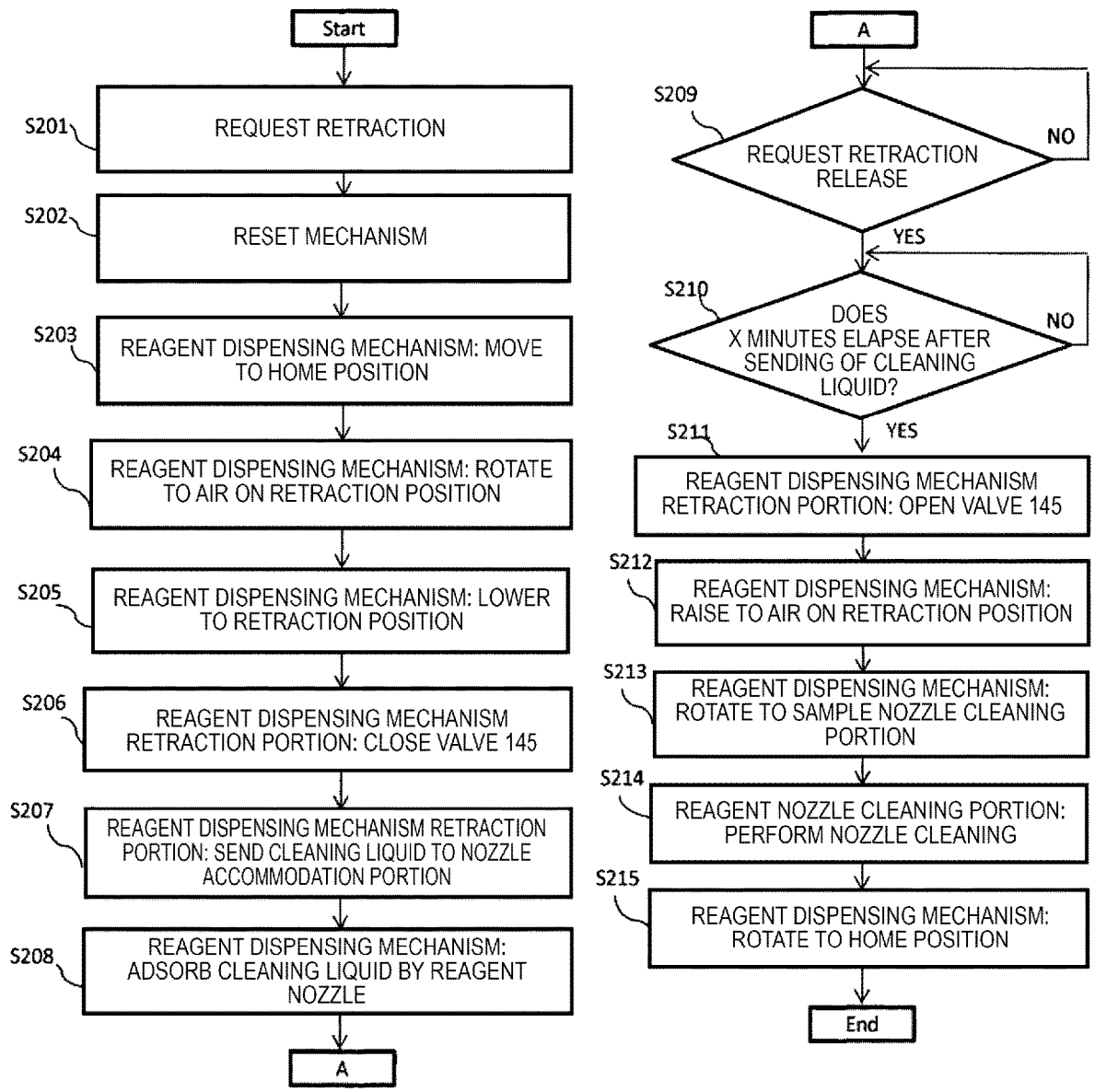

[Fig. 11]
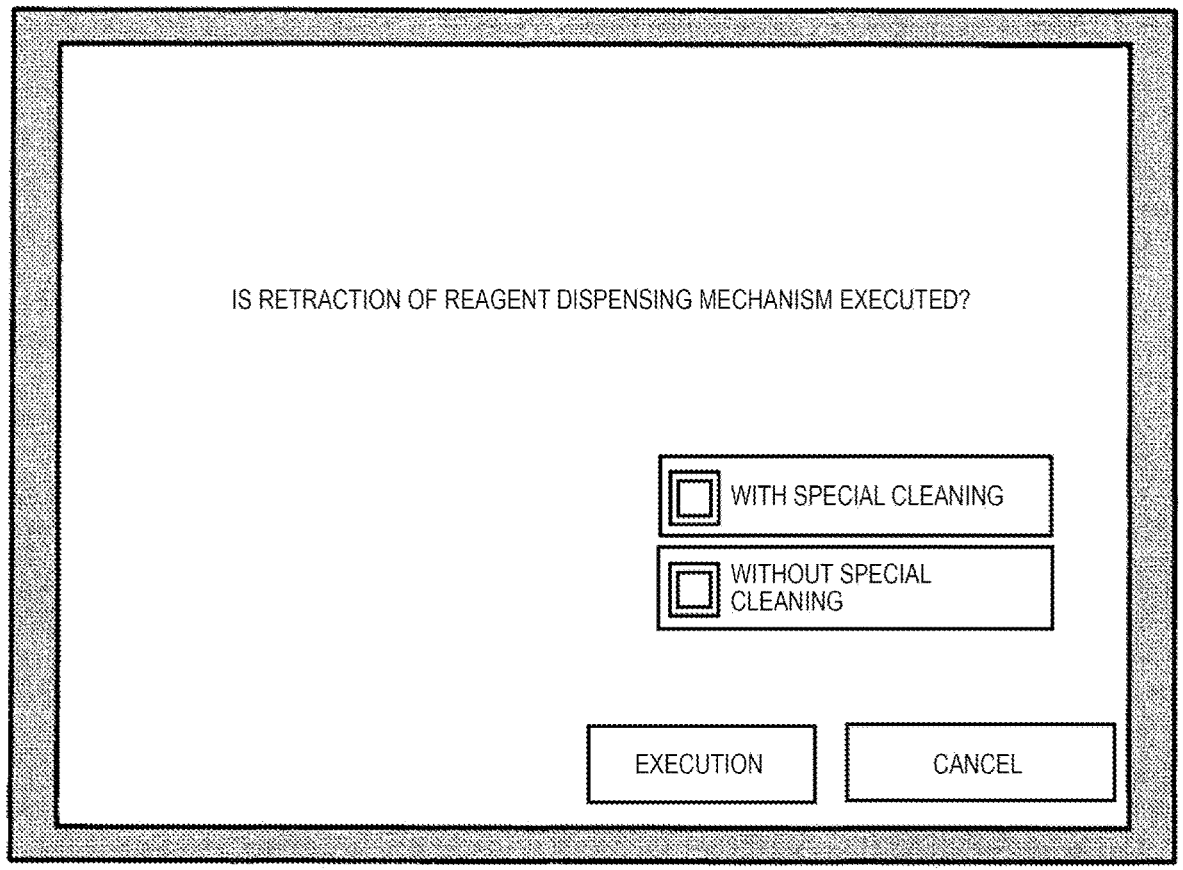

[Fig. 12]
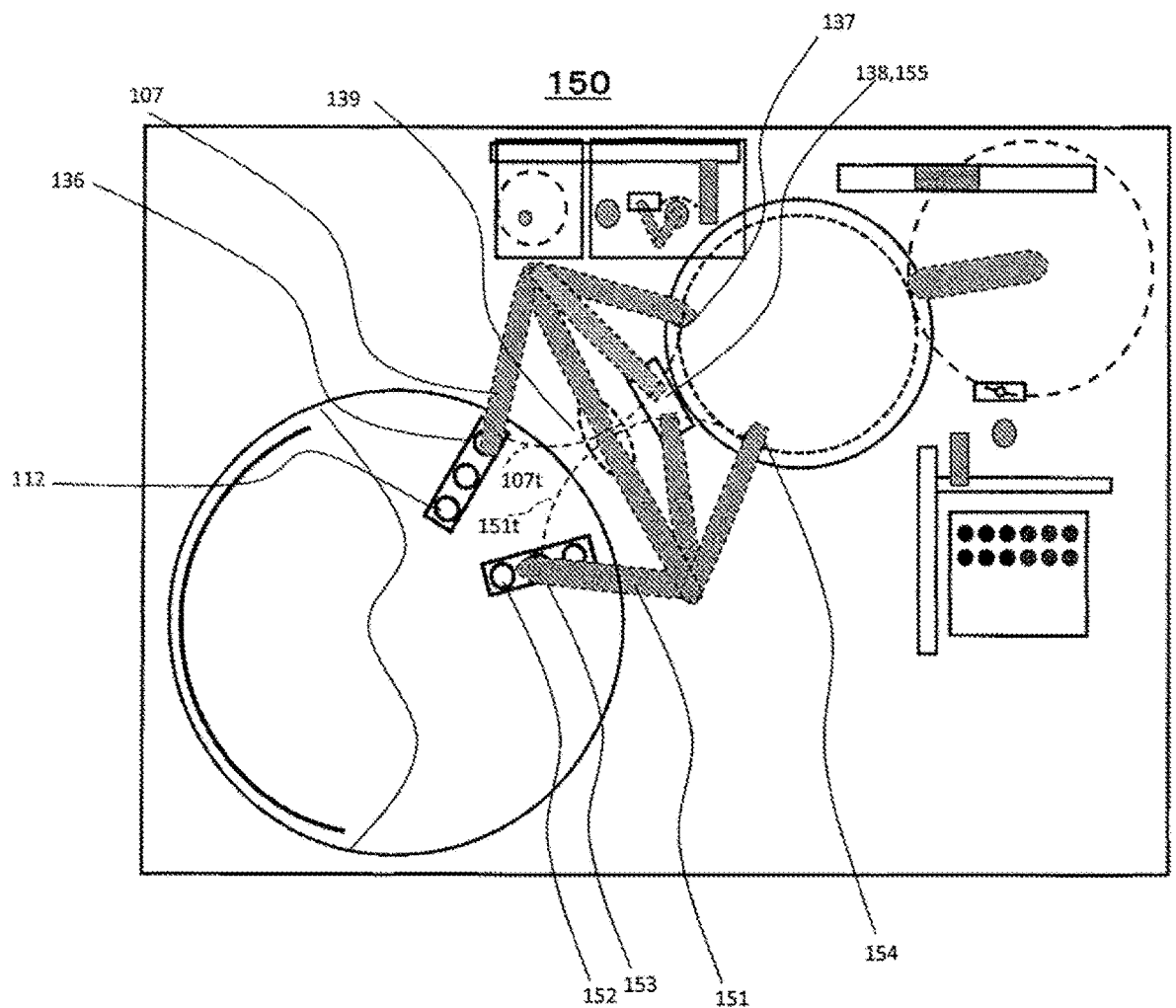

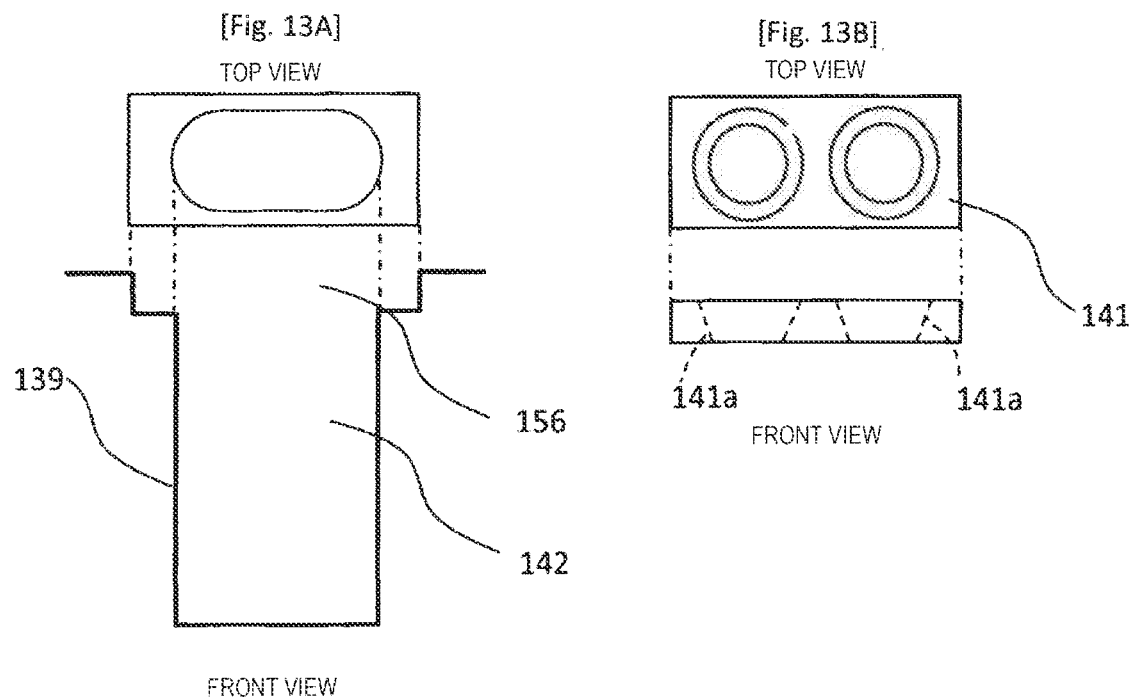
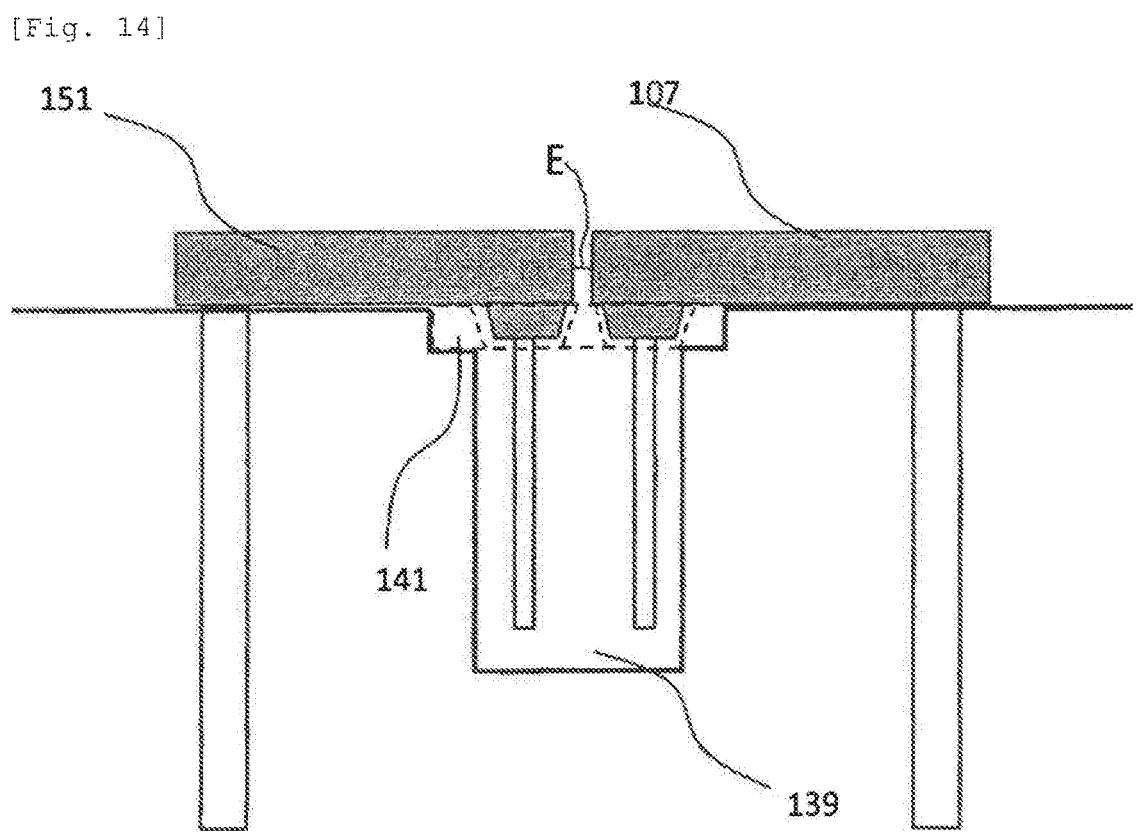

[Fig. 15]
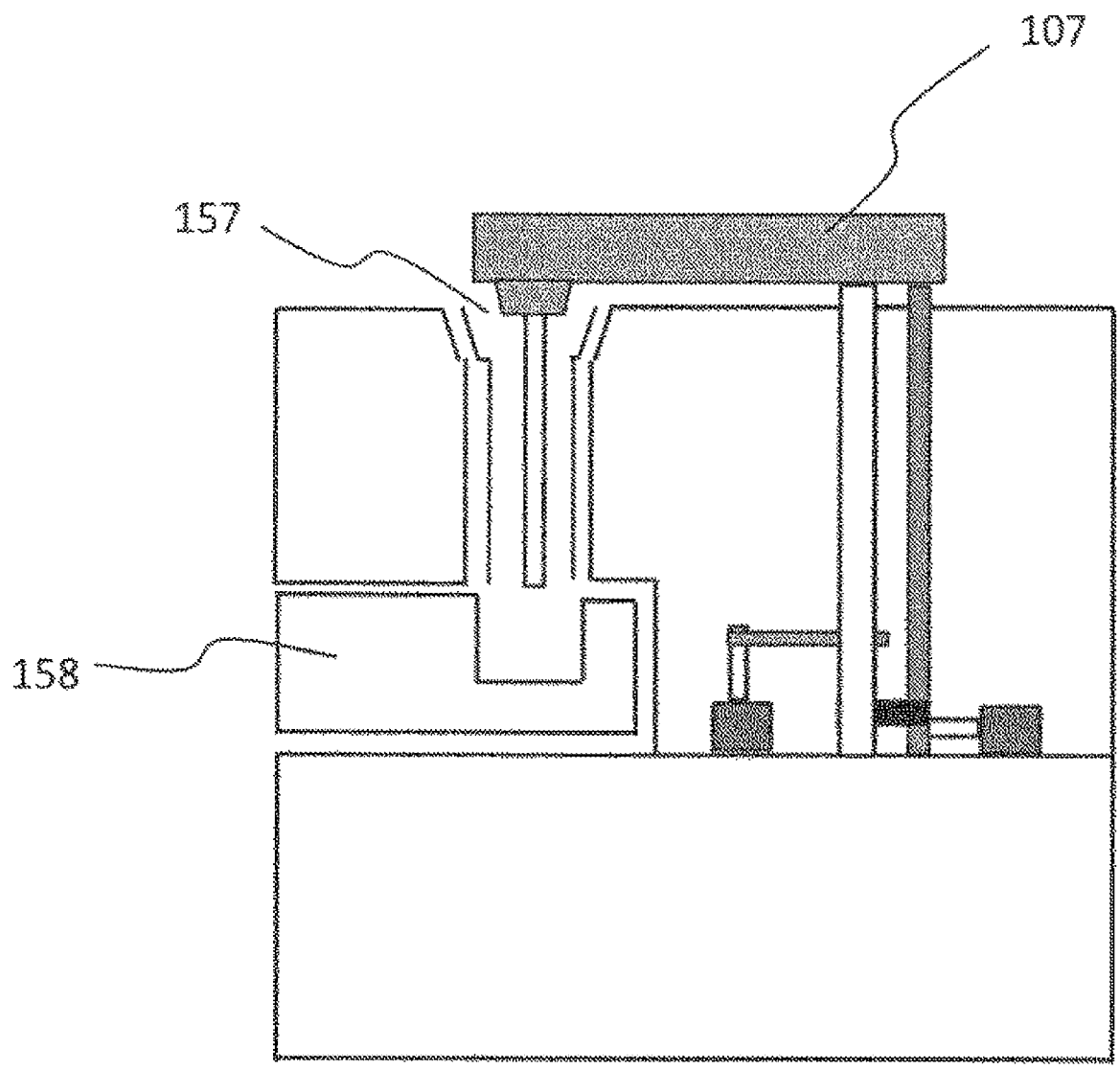

[Fig. 16]
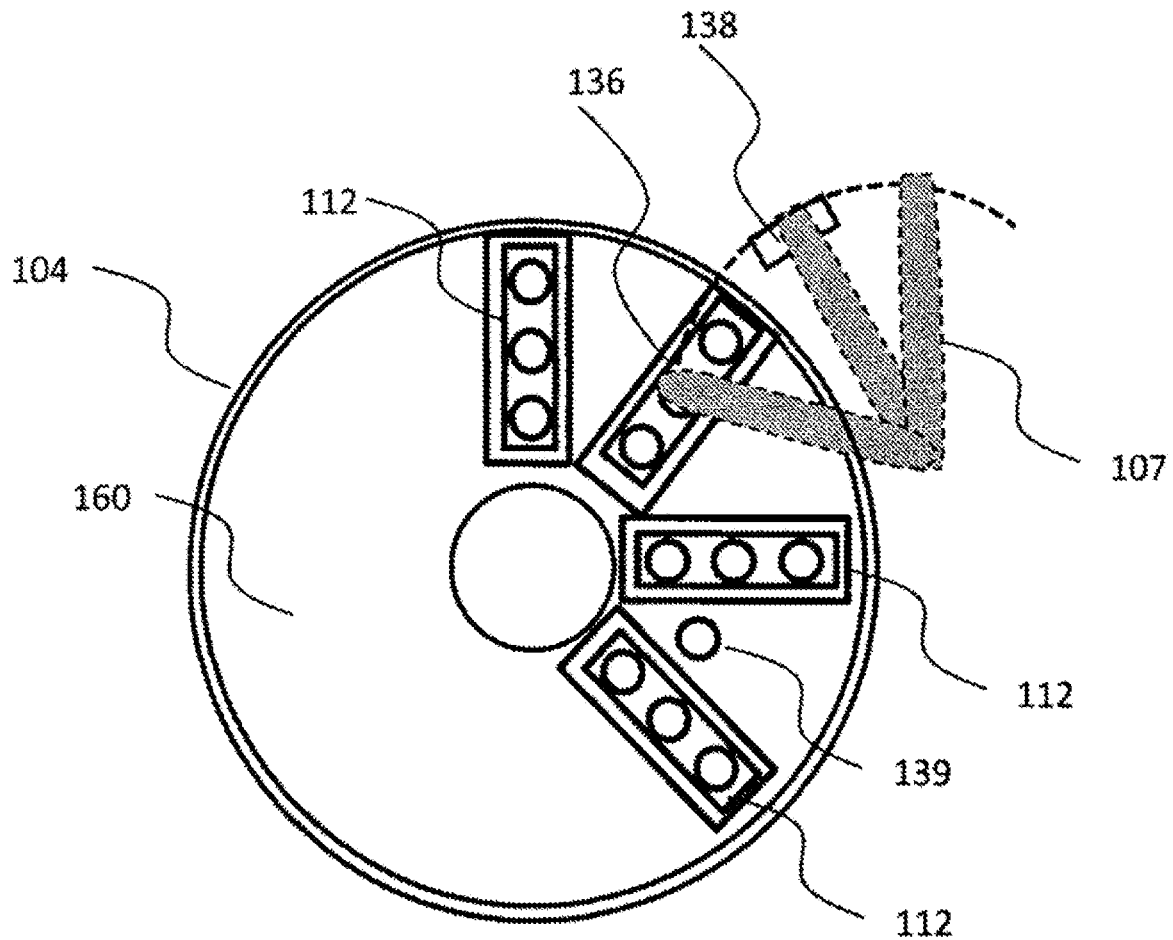
[Fig. 17]
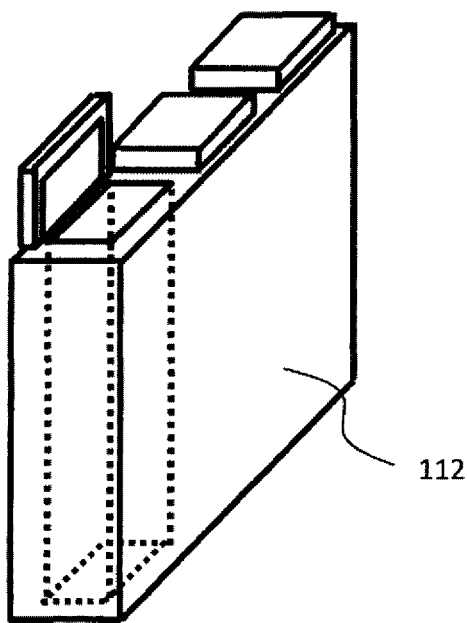

[Fig. 18]
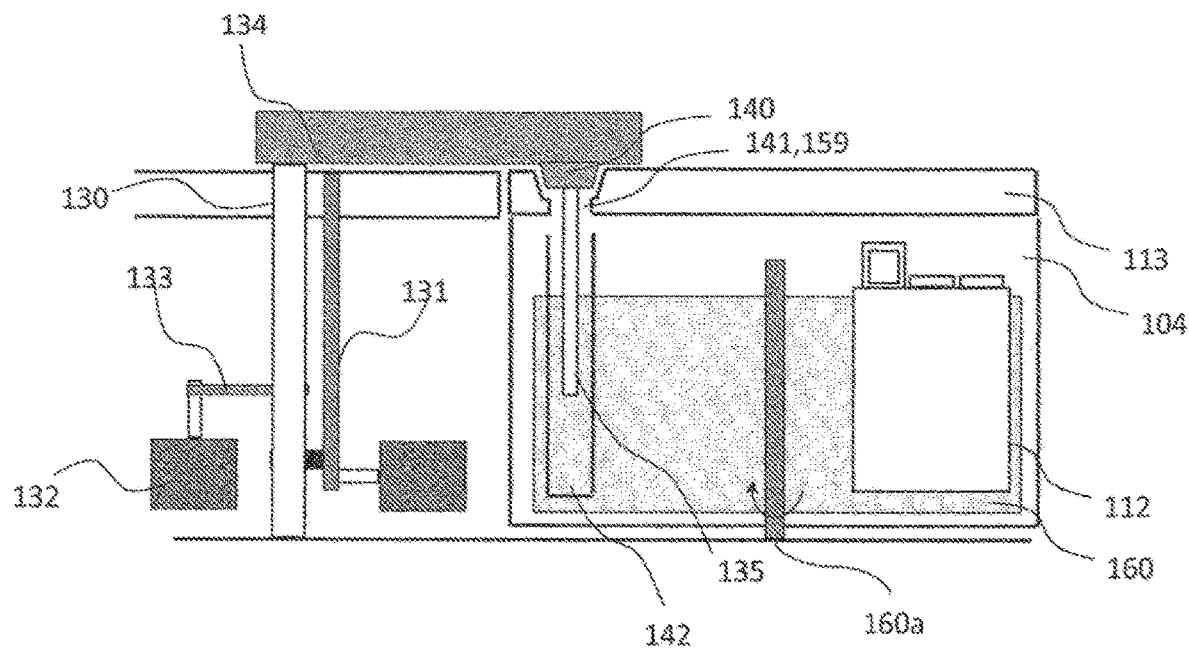

[Fig. 19]
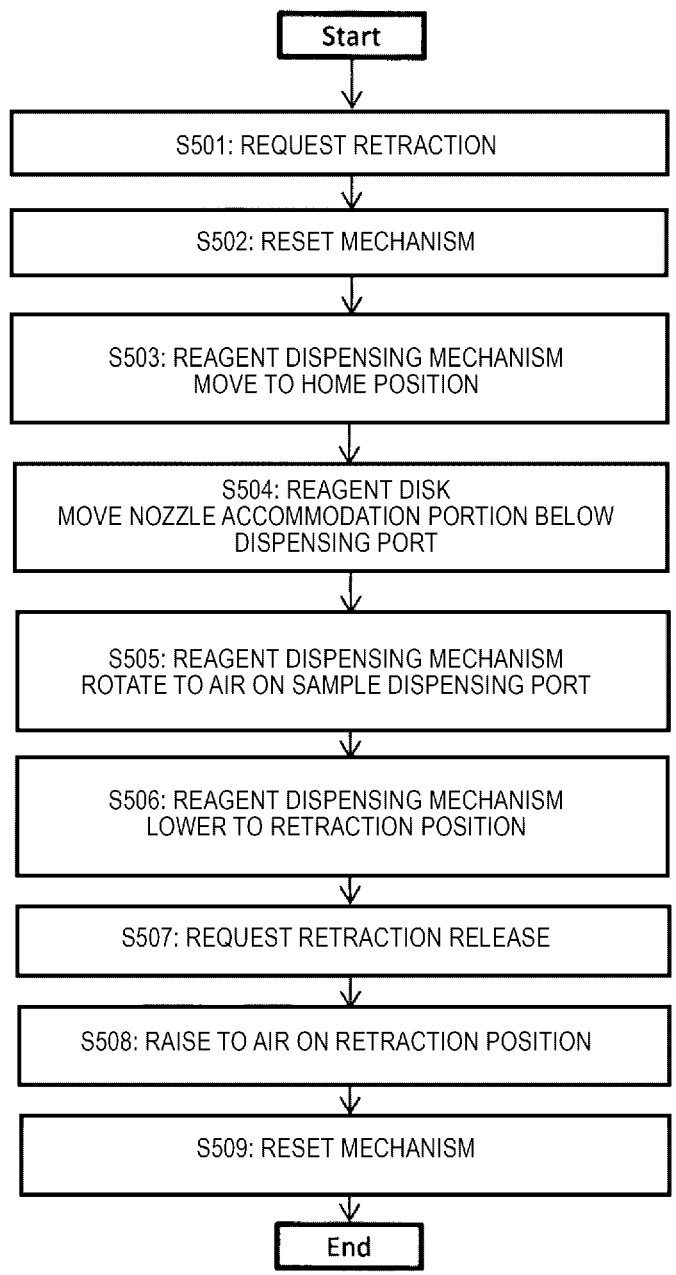

AUTOMATIC ANALYSIS DEVICE

TECHNICAL FIELD

The present invention relates to an automatic analysis device for analyzing a specimen such as blood.

BACKGROUND ART

According to the related art, a user needs to clean a nozzle or a probe that dispenses a specimen or a reagent and a stirrer that stirs the reagent in order to maintain performance of an automatic analysis device at a constant level. Since a reagent bottle is provided, the user may need to put the reagent bottle into and take the reagent bottle out from a reagent storage unit inside the automatic analysis device.

However, the user may have to access to a unit (for example, a B/F separation unit) provided on a rear surface from a front side of the device depending on a unit arrangement of the automatic analysis device or an installation environment of an inspection room or the like of the automatic analysis device. In this case, the user needs to be careful to not contact with a unit (for example, a reagent dispensing mechanism) on a front surface of the device and manually retract a unit that becomes an obstacle. The unit maybe damaged when the user comes into contact with the unit. The user needs to perform work while paying attention to not contact with the unit on a front surface of the device.

Therefore, a technique disclosed in PTL 1 is implemented in a way that the user can smoothly replace the reagent bottle by retracting the dispensing probe that hinders work of the user from a replacement area of the reagent bottle at the time of replacing the reagent bottle.

That is, the technique disclosed in PTL 1 is implemented by a specimen analyzing apparatus used for measuring a specimen by using a reagent. The specimen analyzing apparatus includes a dispensing mechanism that includes a dispensing tube used for suctioning and discharging liquid, a cleaning section that is provided with an opening opened on an upper portion and contains and cleans the dispensing tube from the opening, a reagent container holder from which a reagent container is removable when the reagent container is in a container removal area, a receiving section that receives a replacement command for a replacement of the reagent, a retreating section that retreats the dispensing tube from the container removal area to a retreated position which does not interfere with replacing the reagent container performed by an operator when the replacement command has been received by the receiving section. The dispensing mechanism is configured to be capable of moving the dispensing tube to a suctioning position where the specimen is suctioned, a discharging position where the specimen is discharged, and a cleaning position where the cleaning section cleans the dispensing tube. The retreating section retreats the dispensing tube to a retreated position that is different from a driving path of the dispensing mechanism among the suctioning position, the discharging position, and the cleaning position.

PRIOR ART LITERATURE

Patent Literature

PTL 1: Japanese Patent Number 5553554

SUMMARY OF INVENTION

According to the above-described technique disclosed in PTL 1, accessibility to a reagent removal area in a moving trajectory of the dispensing probe is improved by retreating the dispensing probe from the reagent container removal area to the retreated position that is different from the driving path of the dispensing mechanism among the suctioning position, the discharging position, and the cleaning position when the reagent bottle is replaced.

However, according to a configuration disclosed in PTL 1, even in a case where the dispensing probe is in a moved retreated position, a user may come into contact with the dispensing probe and a risk of damaging the probe in such a case is not taken into consideration.

An object of the invention is to provide an automatic analysis device that can be easily accessed from a front surface of the device to a rear surface side of the device when a user accesses the automatic analysis device and reduce a risk of damaging a rod-shaped member due to contact with the rod-shaped member such as a dispensing probe during accessing.

Solution to Problem

In order to achieve the above object, the invention is implemented as follows.

The automatic analysis device includes a reagent container holding mechanism that holds a reagent container, a reaction mechanism that reacts a reagent and a specimen in the reaction container, an analysis portion that analyzes the specimen in the reaction container, a specimen dispensing mechanism that has a specimen dispensing nozzle used for suctioning the specimen from the specimen container and discharging the specimen into the reaction container, a reagent dispensing mechanism that has a reagent dispensing nozzle for adsorbing a reagent from the reagent container and discharging the reagent into the reactor container, a reagent stirring mechanism that has a stirrer used for stirring the reagent in the reagent container, an upper surface cover that is positioned on a surface on which the reagent container holding mechanism, the reaction mechanism, the analysis portion, the specimen dispensing mechanism, the reagent dispensing mechanism, and the reagent stirring mechanism are disposed, a rod-shaped member retraction portion which is positioned below the upper surface cover and has an accommodation portion which accommodates rod-shaped members of rod-shaped member moving mechanisms which are the specimen dispensing mechanism, the reagent dispensing mechanism, and the reagent stirring mechanism, and a control portion that controls operations of the reagent container holding mechanism, the reaction mechanism, the analysis portion, the specimen dispensing mechanism, the reagent dispensing mechanism, and the reagent stirring mechanism. A dimension of the accommodation portion of the retraction portion in a vertical direction is larger than a dimension of the rod-shaped member in the vertical direction.

Advantageous Effect

According to the invention, the automatic analysis device can be easily accessed from a front surface of the device to a rear surface side of the device when a user accesses the automatic analysis device and reduce the risk of damaging the rod-shaped member due to contact with the rod-shaped member such as a dispensing probe during accessing.

BRIEF DESCRIPTION OF DRAWINGS

FIG. 1 is a schematic configuration view of an automatic analysis device to which a dispensing mechanism retraction method according to a first embodiment of the present invention is applied.

FIG. 2 is a schematic external perspective view of an automatic analysis device according to the first embodiment of the present invention.

FIG. 3 is a schematic view of a reagent dispensing mechanism.

FIG. 4 is a schematic view of a trajectory of a reagent dispensing mechanism and a unit installed on the trajectory according to the first embodiment of the present invention.

FIG. 5 is a front view and a top view of a reagent dispensing mechanism retraction portion according to the first embodiment.

FIG. 6(A) is a view illustrating a state where the reagent dispensing mechanism is retracted to the reagent dispensing mechanism retraction portion and FIG. 6(B) is an enlarged view of the nozzle guide accommodation portion according to the first embodiment.

FIG. 7 is a flowchart of a retraction operation of the reagent dispensing mechanism according to the first embodiment.

FIG. 8 is a view illustrating an example in which a drain tube is connected to a lower portion of a nozzle accommodation portion of the reagent dispensing mechanism retraction portion.

FIG. 9 is a schematic configuration view of a reagent dispensing mechanism retraction portion according to a second embodiment of the present invention.

FIG. 10 is an operation flowchart of the reagent dispensing mechanism and the reagent dispensing mechanism retraction portion at the time of retraction according to the second embodiment of the present invention.

FIG. 11 is a view illustrating an example of a display screen of an operation portion at the time of performing special cleaning according to the second embodiment of the present invention.

FIG. 12 is a schematic configuration view of an automatic analysis device including a plurality of reagent dispensing mechanisms according to a third embodiment of the present invention.

FIGS. 13A and 13B are top and front structural explanatory views of a reagent dispensing mechanism retraction portion in a case where a plurality of reagent dispensing mechanisms share a reagent dispensing retraction position according to the third embodiment of the present invention.

FIG. 14 is a view illustrating a state where the reagent dispensing mechanism is retracted to the reagent dispensing mechanism retraction portion according to the third embodiment of the present invention.

FIG. 15 is a schematic sectional view of an automatic analysis device according to a fourth embodiment of the present invention, as viewed from the side of the device.

FIG. 16 is a schematic top view of a reagent cold storage unit according to a fifth embodiment of the present invention.

FIG. 17 is a view illustrating an example in which quadrangular prism-shaped reagent containers are disposed regularly.

FIG. 18 is a schematic configuration view in a case where a reagent dispensing mechanism retraction portion is provided with respect to a reagent cold storage unit according to the fifth embodiment of the present invention.

FIG. 19 is an operation flowchart in a case where the reagent dispensing mechanism is retracted to the reagent dispensing mechanism retraction portion according to the fifth embodiment of the present invention.

DESCRIPTION OF EMBODIMENTS

Embodiments of the invention will be described below with reference to the drawings.

An example of the automatic analysis device will be described in the present embodiment. Examples of the automatic analysis device include a biochemical automatic analysis device and an immunological automatic analysis device. However, these are merely examples of the invention and the invention is not limited to the embodiments described below. The invention extensively includes a device that reacts a sample and a reagent and analyzes the sample based on a reaction result. For example, the invention may include a mass spectrometer used for a clinical examination and a coagulation analysis device that measures blood clotting time. In addition, the invention may also be applied to a combined system that combines the mass spectrometer and the coagulation analysis device with the biochemical automatic analysis device and immunological automatic analysis device, or an automatic analysis system to which these devices are applied.

Embodiment

First Embodiment

FIG. 1 is a schematic configuration view of an automatic analysis device 101 to which a dispensing mechanism retraction method according to the first embodiment of the present invention is applied.

As shown in FIG. 1, the automatic analysis device 101 includes a rack transport line 103 used for transporting a rack 102, a reagent cold storage unit 104, an incubator disk (reaction disk) 105, a sample (specimen) dispensing mechanism 106, a reagent dispensing mechanism 107, a reagent stirring mechanism 108, an expendable item transport mechanism 109, a B/F separation unit 110, and a detection portion unit 111.

The rack 102 stores a plurality of sample containers (specimen containers) that contain a biological sample (sample) such as blood and urine. The rack 102 is transported on the transport line in a state in which the specimen containers are stored in the rack 102.

The reagent cold storage unit 104 is a reagent container storage unit and contains and cold stores a plurality of reagent containers 112 containing various reagents used for a sample (specimen) analysis. At least a part of an upper surface of the reagent cold storage unit 104 is covered by a reagent disk cover 113. A part of the reagent disk cover 113 can be opened and closed, and the reagent containers 112 can be put in and taken out.

The incubator disk 105 includes a reaction container disposing portion 115 in which a plurality of reaction containers 114 used for reacting a sample and a reagent are disposed, and a temperature adjustment mechanism (not shown) used for adjusting a temperature of the reaction containers 114 to a desired temperature. The sample dispensing mechanism 106 includes a rotation drive mechanism and an up and down drive mechanism. The drive mechanisms can suction a sample from a sample container, move the sample onto the reaction container 114 contained in the incubator disk 105, and dispense the sample into the reaction container 114.

The reagent dispensing mechanism 107 includes the same rotation drive mechanism and up and down drive mechanism. The drive mechanisms suction a reagent from the reagent container 112, move the reagent onto the reaction container 114 contained in the incubator disk 105, and dispense the reagent into the reaction container 114.

The reagent stirring mechanism 108 includes a rotation drive mechanism and an up and down drive mechanism, and stirs a reagent in the reagent containers 112 by rotating a rod-shaped stirring paddle (stirrer) 108a. The automatic analysis device 101 further includes a reagent stirring paddle cleaning portion 161 used for cleaning the stirring paddle.

The expendable item supply mechanism 109 transports a plurality of unused reaction containers 114 and dispensing tips 116 from a reaction container dispensing chip accommodation container 117 to a dispensing tip installation position 118 accessed by the incubator disk 105 or the sample dispensing mechanism 106, and transports the reaction containers 114 containing reaction liquid from the incubator disk 105 to a stirring mechanism 119.

The B/F separation unit 110 includes a separation portion 120 that collects magnetic particles, a B/F separation probe 121 that suctions reaction liquid and discharges a buffer solution, a B/F separation probe cleaning portion 122 that cleans the B/F separation probe 121, a B/F separation stirring portion 123 used for re-dispersing magnetic particles that are temporarily collected, and a transport portion 124 that transports the reaction containers 114 disposed on the incubator disk 105 to the B/F separation unit 110 or the detection portion unit 111.

The detection portion unit 111 includes a reaction liquid suction nozzle 125 that suctions reaction liquid in the reaction containers 114, a photomultiplier tube or a light source lamp, a spectrometer, and a photo diode. The detection portion unit 111 has a function of adjusting a temperature of these members and analyzes the reaction liquid.

In addition to analysis operation units described above, the automatic analysis device 101 further includes a control portion 126 that controls operations of the entire automatic analysis device 101 including the reagent cold storage unit 104, the incubator disk 105, the detection portion unit 111, the sample dispensing mechanism 106, the reagent dispensing mechanism 107, the reagent stirring mechanism 108, and the like, and an operation portion 127.

For example, the control portion 126 is formed of a hardware substrate and is connected to a control device such as a computer or a storage device such as a hard disk. For example, the operation portion 127 includes a display unit that is a display and an input device such as a mouse and a keyboard. The control device connected to the control portion 126 may be implemented by a dedicated circuit board serving as hardware, or may be implemented by software executed by a computer connected to the automatic analysis device 101.

When the control device is implemented by hardware, a plurality of calculators that perform processing may be integrated on a wiring substrate or in a semiconductor chip or package.

When the control device is implemented by software, the computer may be provided with a high-speed general-purpose CPU and may execute a program to execute desired arithmetic processing. An existing device may be upgraded using a recording medium that records the program. The devices or the circuit is connected with the computer via a wired or wireless network and data is transmitted and received as appropriate.

FIG. 2 is a schematic external perspective view of an automatic analysis device 101 according to the first embodiment of the present invention. As shown in FIG. 2, the automatic analysis device 101 includes a top cover 200 that covers the entire automatic analysis device 101 on an upper portion, and a lock portion (not shown) that locks the top cover 200 when the top cover 200 is opened or closed. The automatic analysis device 101 is implemented in a way that the top cover 200 can not be opened when various units in the top cover 200 are operated.

An upper surface cover 201 is disposed at a position on a surface where the reagent cold storage unit (a reagent container holding mechanism) 104, the incubator disk 105 (a reaction mechanism), the detection portion unit 111 (an analysis portion), the sample dispensing mechanism 106 (a specimen dispensing mechanism), the reagent stirring mechanism 108, and the reagent dispensing mechanism 107 of the automatic analysis device 101 are disposed. The upper surface cover 201 is separated from the reagent disk cover 113 and the like of the reagent cold storage unit 104. A sample (specimen) dispensing nozzle 106a is attached to a tip portion of the sample dispensing mechanism 106 in FIG. 2.

FIG. 3 is a schematic view of the reagent dispensing mechanism 107. In FIG. 3, the reagent dispensing mechanism 107 includes an up and down drive motor 128, a shaft 130 that is movable up and down independent of a mechanism shaft 129, and an up and down drive belt 131 that connects the up and down drive motor 128 and the shaft 130 such that the reagent dispensing mechanism 107 can drive a reagent dispensing nozzle 135 up and down.

The reagent dispensing mechanism 107 further includes a rotation drive motor 132, a rotation drive belt 133 that connects the rotation drive motor 132 and the mechanism shaft 129 such that the reagent dispensing mechanism 107 can rotationally drive the reagent dispensing nozzle 135.

The reagent dispensing mechanism 107 includes an arm 134 that is attached to an upper portion of the shaft 130 and extends in a horizontal direction, and a nozzle guide (a rod-shaped member guide) 140 that is formed on a lower surface of a tip of the arm 134 and fixes a position of the reagent dispensing nozzle 135. The nozzle guide 140 includes a side surface portion 140w and a bottom surface portion 140b. The reagent dispensing nozzle 135 extends downwards from the bottom surface portion 140b. The reagent dispensing nozzle 135 is connected to a pressure source such as a syringe or a pump to suction or discharge liquid from a tip of the reagent dispensing nozzle 135 through a flow path. A drive direction of the reagent dispensing mechanism 107 is a 0-Z direction in an example shown in FIG. 3. Alternatively, a mechanism capable of moving in X, Y and Z directions may be used. A diameter of the bottom surface portion 14b is γ.

FIG. 4 is a schematic view of a trajectory of the reagent dispensing mechanism 107 and units disposed on the trajectory according to the first embodiment.

In FIG. 4, the reagent dispensing mechanism 107 can access a plurality of units disposed on a trajectory 107t of the arm 134 by combining an up and down drive mechanism and a rotation drive mechanism shown in FIG. 3. The trajectory 107t of the arm 134 is provided with a reagent suction position 136 used for suctioning a reagent from the reagent container 112 in the reagent cold storage unit 104, a reagent discharge position 137 used for discharging the reagent to the reaction container 114 on the incubator disk 105, a reagent dispensing nozzle cleaning portion 138 used for cleaning the reagent dispensing nozzle 135, and a reagent dispensing mechanism retraction portion 139 that retracts the reagent dispensing mechanism 107.

The reagent dispensing mechanism retraction portion 139 may be positioned on the trajectory 107t that connects the reagent suction position 136 that is generally used in a reagent dispensing operation, the reagent discharge position 137, and the reagent dispensing nozzle cleaning portion 138, or on the outside of the trajectory.

Only one reagent suction position 136 or one reagent discharge position 137 is shown in FIG. 4. Alternatively, a plurality of reagent suction positions 136 or reagent discharge positions 137 may be provided.

FIG. 5 is a front view of the reagent dispensing mechanism retraction portion 139 that retracts the reagent dispensing mechanism 107 as viewed from a front direction of the automatic analysis device and a top view of the reagent dispensing mechanism retraction portion 139 as viewed from an upper portion of the automatic analysis device according to the first embodiment. The reagent dispensing mechanism retraction portion 139 is disposed on the upper surface cover 201 of the automatic analysis device 101. The reagent dispensing mechanism retraction portion 139 includes a nozzle guide accommodation portion (a rod-shaped member guide accommodation portion) 141 that accommodates the nozzle guide 140 of the reagent dispensing mechanism 107, and a nozzle accommodation portion (a rod-shaped member accommodation portion) 142 that accommodates the reagent dispensing nozzle 135.

The reagent dispensing mechanism retraction portion 139 is a cylindrical member protruding downwards from the upper surface cover 201. The nozzle accommodation portion 142 is provided inside the cylindrical member of the reagent dispensing mechanism retraction portion 139. A user is prevented from directly contacting with the reagent dispensing nozzle 135 by positioning the reagent dispensing nozzle 135 inside the nozzle accommodation portion 142.

A dimension of the nozzle accommodation portion 142 in a vertical direction is larger than a dimension of the reagent dispensing nozzle 135 in the vertical direction. A tip portion of the reagent dispensing nozzle 135 is prevented from contacting with a bottom surface of the nozzle accommodation portion 142.

A diameter γ of the bottom surface 140b of the nozzle guide 140 is smaller than a diameter a of an upper opening of the nozzle guide accommodation portion 141, and is larger than a diameter of a lower opening of the nozzle guide accommodation portion 141 (=a diameter β of a bottom surface of the nozzle accommodation portion 142). The lower opening of the nozzle guide accommodation portion 141 is an upper opening of the nozzle accommodation portion 142 and communicates with the nozzle accommodation portion 142. An annular horizontal portion (bottom surface portion) H is formed around the lower opening of the nozzle guide accommodation portion 141.

The reagent dispensing mechanism retraction portion 139 is configured to be detachable from the upper surface cover 201 of the automatic analysis device 101. For example, the automatic analysis device 101 includes a reagent dispensing mechanism retraction portion accommodation portion. An outer wall of the nozzle guide accommodation portion 141 and an upper portion of the reagent dispensing mechanism retraction portion accommodation portion are formed with screw threads (not shown) so that the outer wall of the nozzle guide accommodation portion 141 and the upper portion of the reagent dispensing mechanism retraction portion accommodation portion may be engaged with each other. The reagent dispensing mechanism retraction portion 139 can be fixed to the automatic analysis device 101 by rotating the reagent dispensing mechanism retraction portion 139 while inserting the reagent dispensing mechanism retraction portion 139 into the reagent dispensing mechanism retraction portion accommodation portion. The reagent dispensing mechanism retraction portion 139 is detachable from the upper surface cover 201 so that it is easy to clean the reagent dispensing mechanism retraction portion 139.

The reagent dispensing mechanism retraction portion 139 has a structure in which the reagent dispensing nozzle 135 does not come into contact with an inner wall surface of the nozzle accommodation portion 142 even when a user comes into contact with the arm 134 in a state in which the reagent dispensing mechanism 107 is retracted to the reagent dispensing mechanism retraction portion 139.

FIG. 6(A) is a view illustrating a state in which the reagent dispensing mechanism 107 is retracted to the reagent dispensing mechanism retraction portion 139 and FIG. 6(B) is an enlarged view of the nozzle guide accommodation portion 141 according to the first embodiment.

In the state in which the reagent dispensing mechanism retraction portion 139 retracts the reagent dispensing mechanism 107 shown in FIG. 6(A) and FIG. 6(B), a clearance (a clearance B) between a side surface of the reagent dispensing nozzle 135 and the inner wall surface of the nozzle accommodation portion 142 is larger than a clearance (a clearance A) between an outer surface (the side surface 140w) of the nozzle guide 140 and an inner wall surface of the nozzle guide accommodation portion 141 (the clearance A<the clearance B).

Accordingly, when the user comes into contact with the arm 134 during maintenance, the nozzle guide 140 comes into contact with the inner wall surface of the nozzle guide accommodation portion 141, so that the reagent dispensing nozzle 135 can be prevented from contacting with the inner wall surface of the nozzle accommodation portion 142.

A clearance (a clearance C) between the horizontal portion (the bottom surface portion) H of the nozzle guide accommodation portion 141 and the bottom surface portion 140b of the nozzle guide 140 is smaller than a clearance (a clearance D) between the tip of the nozzle 135 and the bottom surface of the nozzle accommodation portion 142 (the clearance C<the clearance D).

Accordingly, even when the reagent dispensing nozzle 135 is maximally lowered in the reagent dispensing mechanism retraction portion 139, the nozzle guide 140 comes into contact with the horizontal portion H of the nozzle guide accommodation portion 141, and the tip of the reagent dispensing nozzle 135 does not come into contact with the bottom surface of the nozzle accommodation portion 142.

The first embodiment describes an example in which a cross-sectional shape of the nozzle guide 140, the reagent dispensing mechanism retraction portion 139 and the nozzle guide accommodation portion 141 is a circular shape when viewed from above of the device. Alternatively, it may not be necessarily that the cross-sectional shape of the nozzle guide 140 and the nozzle guide accommodation portion 141 is a circular shape when viewed from above of the device, and may be a polygonal shape as long as the nozzle guide 140 and the nozzle guide accommodation portion 141 have the same cross-sectional shape.

In addition, a cross-sectional shape of the nozzle accommodation portion 142 may be different from the cross-sectional shape of the nozzle guide 140 and the nozzle guide accommodation portion 141. When the cross-sectional shape of the nozzle accommodation portion 142 is a polygonal shape, a clearance (the clearance B) between the reagent dispensing nozzle 135 and a peak or a side of the polygonal shape that is closest to the outer wall surface of the nozzle accommodation portion 142 needs to be larger than a clearance (the clearance A) between the outer surface of the nozzle guide 140 and the inner wall surface of the nozzle guide accommodation portion 141 (the clearance A<the clearance B).

Next, FIG. 7 shows an example in which a retraction operation of the reagent dispensing mechanism 107 that is provided in the automatic analysis device 101 when a user performs maintenance on the automatic analysis device 101.

FIG. 7 is a flowchart of the retraction operation of the reagent dispensing mechanism 107 according to the first embodiment. In step S101 in FIG. 7, when a button or a hard switch for maintenance is displayed on the operation portion 127 to instruct a retraction request for the reagent dispensing mechanism 107 and the retraction request is received, the control portion 126 locks the top cover 200 by the lock portion. Then, in step S102, the mechanism of the reagent dispensing mechanism 107 is reset. In step S103, the reagent dispensing mechanism 107 is moved to a home position (for example, the reagent dispensing nozzle cleaning portion 138) that is a different position from the reagent dispensing mechanism retraction portion 139. The home position may be any position where the reagent dispensing mechanism retraction portion 139 is not presented, and may be a specific position on a unit disposed on the trajectory of the reagent dispensing mechanism 107 shown in FIG. 4 or on the trajectory where no unit is presented.

In step S104, the control portion 126 rotates the reagent dispensing mechanism 107, moves the reagent dispensing mechanism 107 above the reagent dispensing mechanism retraction portion 139. In step S105, the reagent dispensing mechanism 107 is lowered and stored in the reagent dispensing mechanism retraction portion 139. When the user completes maintenance such as cleaning the B/F separation probe 121, the button or the hard switch for maintenance is again displayed on the operation portion 127 to instruct a retraction release request for the reagent dispensing mechanism 107, the retraction release request is received in step S106, and the reagent dispensing mechanism 107 is raised above a retraction position in step S107. Then, in step S108, when the reagent dispensing mechanism 107 is rotated to the home position and the top cover 200 is unlocked, the retraction operation is ended.

The automatic analysis device 101 described in the first embodiment includes the reagent dispensing mechanism retraction portion 139 corresponding to the reagent dispensing mechanism 107. Alternatively, when the automatic analysis device 101 includes a plurality of reagent dispensing mechanisms 107, the automatic analysis device 101 may include a plurality of reagent dispensing retraction portions 139 corresponding to the plurality of reagent dispensing mechanisms 107 respectively.

A drain tube that discharges liquid dripped from the reagent dispensing nozzle 135 may be connected to the reagent dispensing mechanism retraction portion 139. For example, as shown in FIG. 8 in a simplified manner, a drain tube 144 that communicates with an outside of the automatic analysis device 101 is connected to a lower portion of the nozzle accommodation portion 142 of the reagent dispensing mechanism retraction portion 139, and the liquid can be discharged to the outside of the automatic analysis device 101. Waste liquid is processed by placing a tank directly below the drain tube 144 by the user, or directly connecting a facility tube to the drain tube 144. Further, the drain tube 144 may discharge the waste liquid to the outside of the automatic analysis device 101 after the drain tube 144 joins a flow path through which the waste liquid discharged from the other units inside the automatic analysis device 101 flows.

In addition, a valve may be provided in the intermediate of the drain tube 144.

When the drain tube 144 is connected to the lower portion of the nozzle accommodation portion 142 and the reagent dispensing mechanism retraction portion 139 needs to be cleaned, the inner wall of the nozzle accommodation portion 142 is cleaned by discharging system water from the reagent dispensing nozzle 135 or dripping cleaning water by the user. Accordingly, cleaning can be performed without removing the reagent dispensing mechanism retraction portion 139 from the automatic analysis device 101.

The first embodiment describes an example of the reagent dispensing nozzle 135 (a rod-shaped member) of the reagent dispensing mechanism 107. Alternatively, a rod-shaped member of the reagent stirring mechanism 108 (a stirrer) or a rod-shaped member of the sample dispensing mechanism 106 (the specimen dispensing nozzle) may also include a retraction portion having the same configuration as the reagent dispensing mechanism retraction portion 139. In such a case, the same effect as the reagent dispensing mechanism retraction portion 139 is obtained. The sample dispensing mechanism 106 and the reagent stirring mechanism 108 have the same configuration as the reagent dispensing mechanism 107 shown in FIG. 3. However, instead of a nozzle such as the reagent dispensing nozzle 135, a rod-shaped stirrer is attached to the reagent stirring mechanism 108. The reagent dispensing mechanism 107, the sample dispensing mechanism 106, and the reagent stirring mechanism 108 may be defined as rod-shaped member moving mechanisms.

According to the first embodiment, the reagent dispensing mechanism retraction portion 139 is a structure independent of the other units. Alternatively, the reagent dispensing mechanism retraction portion 139 maybe integrated with the other units. For example, the reagent dispensing mechanism retraction portion 139 may be integrated with the reagent dispensing nozzle cleaning portion 138, an operating range of the reagent dispensing mechanism 107 can be narrowed and a configuration of mechanisms can be simplified.

The first embodiment describes an example in which the retraction operation is performed when the user cleans the automatic analysis device 101. Alternatively, the retraction operation may be performed when a service person performs work of replacing various units.

According to the first embodiment of the invention, when cleaning or maintenance of units such as the B/F separation unit 110 and the detection portion unit 111 that are disposed on a rear side of the automatic analysis device and replacement work of each unit are performed, an operator can easily access a target unit by moving the reagent dispensing mechanism 107 disposed on a front side of the automatic analysis device 101 in a rotation direction and retracting the reagent dispensing mechanism 107 to the reagent dispensing mechanism retraction portion 139.

Visibility of the target unit at the time of cleaning or the like can be improved and work can be performed safely by moving the reagent dispensing mechanism 107 in an up-down direction and retracting the reagent dispensing mechanism 107 to the reagent dispensing mechanism retraction portion 139.

The risk of damaging the reagent dispensing nozzle 135 can be reduced even when a user or the like comes into contact with the reagent dispensing mechanism 107 positioned in the reagent dispensing mechanism retraction portion 139 by providing a structure of the reagent dispensing mechanism retraction portion 139.

That is, according to the first embodiment of the invention, it is possible to provide an automatic analysis device which can be accessed from a front surface of the device to a rear surface side of the device when the user accesses the automatic analysis device and reduce the risk of damaging a rod-shaped member due to contact with the rod-shaped member such as a dispensing probe during accessing.

Second Embodiment

Next, a second embodiment which is a modification of the first embodiment will be described.

The reagent dispensing mechanism retraction portion 139 according to the first embodiment includes the nozzle guide accommodation portion 141 that accommodates the arm 134 of the reagent dispensing mechanism 107 and the nozzle accommodation portion 142 that accommodates the reagent dispensing nozzle 135. The control portion 126 is configured such that an operation of each mechanism is not performed when a user completes work and the reagent dispensing mechanism 107 is moved to the home position after the reagent dispensing mechanism 107 is retracted.

In contrast, according to the second embodiment, a special cleaning is performed for a reagent nozzle by sending cleaning liquid to the nozzle accommodation portion 142 when the reagent dispensing mechanism 107 is retracted and immersing the reagent dispensing nozzle 135 in the cleaning liquid.

In the second embodiment, since the other configurations are the same as the configurations in the first embodiment except for a configuration of the reagent dispensing mechanism retraction portion 139, the other configurations are not shown and detailed description thereof is omitted.

The configuration of the reagent dispensing mechanism retraction portion 139 according to the second embodiment will be described with reference to FIG. 9. FIG. 9 is a schematic configuration view of the reagent dispensing mechanism retraction portion 139 according to the second embodiment. In FIG. 9, the reagent dispensing mechanism retraction portion 139 includes the nozzle guide accommodation portion 141 that accommodates the nozzle guide 140 of the reagent dispensing mechanism 107 and the nozzle accommodation portion 142 that accommodates the reagent dispensing nozzle 135. The reagent dispensing mechanism retraction portion 139 further includes the drain tube 144 that is connected to a lower portion of the nozzle accommodation portion 142 and discharges liquid dripped from the reagent dispensing nozzle 135, a drain valve 145 that is disposed on the drain tube 144 and switches between storing and discharging the cleaning liquid in the nozzle accommodation portion 142, a supply path 146 that is connected to a side surface of the nozzle accommodation portion 142 so as to supply the cleaning liquid to the nozzle accommodation portion 142 and communicates with an inside of the nozzle accommodation portion 142, a cleaning bottle 148 that contains the cleaning liquid, a liquid sending source 149 that sends the cleaning liquid from the cleaning bottle 148 to the nozzle accommodation portion 142 via the supply flow path 146, and a supply flow path valve 147 that is disposed on the supply flow path 146 and switches between supplying and stopping the cleaning liquid to the nozzle accommodation portion 142.

FIG. 10 is an operation flowchart of the reagent dispensing mechanism 107 and the reagent dispensing mechanism retraction portion 139 at the time of retraction according to the second embodiment.

In FIG. 10, when a retraction request for the reagent dispensing mechanism 107 is received in step S201, the control portion 126 locks the top cover 200 of the automatic analysis device 101 and performs a reset operation for each mechanism in step S202. Thereafter, the control portion 126 moves the reagent dispensing mechanism 107 to a home position in step S203, and then retracts the reagent dispensing mechanism 107 to the reagent dispensing mechanism retraction portion 139 in steps S204 and S205.

Thereafter, the control portion 126 closes the drain valve 145 in step S206, and uses the liquid sending source 149 to suction the cleaning liquid from the cleaning bottle 148 and sends the cleaning liquid to the nozzle accommodation portion 142 in step S207. A storage device that is provided in the control portion 126 stores a liquid sending end time of the cleaning liquid.

In step S208, the control portion 126 suctions the cleaning liquid to the reagent dispensing nozzle 135. Then, the control portion 126 determines whether there is a retraction release request from the user in step S209. When the retraction release request is received, the control portion 126 inquires an elapsed time from the liquid sending end time of the cleaning liquid stored in the storage device of the control portion 126 in step S210. When a predetermined time is elapsed in step S210, operations after step S211 are performed. When the predetermined time is not elapsed in step S210, the control portion 126 regularly inquires an elapsed time and performs the operations after step S211 after the predetermined time is elapsed.

The control portion 126 opens the valve 145 and discharges the cleaning liquid from the nozzle accommodation portion 142 to the drain tube 144 in step S211. After discharging of the cleaning liquid is completed, the control portion 126 moves the reagent dispensing mechanism 107 above the reagent dispensing mechanism retraction portion 139 in step S212, and rotates the reagent dispensing mechanism 107 to the reagent nozzle cleaning portion 138 instep S213. The control portion 126 discharges the cleaning liquid suctioned in step S208 and cleans the reagent nozzle 135 in the reagent nozzle cleaning portion 138 in step S214. After cleaning is completed, in step S215, the reagent dispensing mechanism 107 is moved to the home position (the reagent dispensing mechanism 107 is not moved when the home position is at the reagent nozzle cleaning portion 138), lock on the top cover 200 of the automatic analysis device 101 is released, and the retraction operation is ended.

The special cleaning may use the same cleaning liquid used in the reagent nozzle cleaning portion 138, or may use different cleaning liquid. Contamination that cannot be cleaned by normal cleaning performed by the reagent nozzle cleaning portion 138 can be cleaned by performing cleaning for a longer time than a cleaning time when the special cleaning is performed in the reagent nozzle cleaning portion 138. As shown in FIG. 11, the special cleaning can be selected on a display screen of the operation portion 127 by displaying on the display screen whether the user selects to perform the special cleaning during the retraction request.

According to the second embodiment of the invention, in addition to the same effect as the first embodiment, the special cleaning of the reagent dispensing nozzle 135 can be performed simultaneously with maintenance performed by the user, a time required for maintenance of the automatic analysis device can be shortened, and downtime of the automatic analysis device can be reduced.

Third Embodiment

Next, a third embodiment of the invention will be described. The third embodiment is a modification of the first and second embodiments and describes an example of a configuration in which a plurality of reagent dispensing mechanisms share one retraction position. The same configurations as in the first and second embodiments are not shown and detailed description thereof is omitted.

FIG. 12 is a schematic configuration view of an automatic analysis device 150 including a plurality of reagent dispensing mechanisms according to the third embodiment. Since the automatic analysis device 150 has the same configuration with the automatic analysis device 101 according to the first embodiment except for the configuration including the plurality of reagent dispensing mechanisms, a description of the same configuration will be omitted.

FIG. 12 shows an example of the reagent dispensing mechanisms on an X-θ trajectory. In FIG. 12, two reagent dispensing mechanisms 107 and 151 are disposed such that driven circular arc trajectories 107t and 151t of the reagent dispensing mechanisms 107 and 151 are brought close to each other. The reagent suction position 136 and a reagent suction position 153 where reagents are suctioned from the reagent container 112 and a reagent container 152 in the reagent cold storage unit 104, the reagent discharge position 137 and a reagent discharge position 154 where reagents are discharged to the reaction container 114 on the incubator disk 105, the reagent dispensing nozzle cleaning portion 138 and a reagent dispensing nozzle cleaning portion 155 where the reagent dispensing nozzle 135 is cleaned, and the reagent dispensing mechanism retraction portion 139 that retracts the reagent dispensing mechanisms 107 and 151 are disposed on the trajectories 1 07t and 151t of the reagent dispensing mechanisms 107 and 151 respectively.

The reagent dispensing mechanism retraction portion 139 is disposed at a position where the circular arc trajectories 107t and 151t of the two reagent dispensing mechanisms 107 and 151 are brought into contact with each other. Accordingly, the two reagent dispensing mechanisms 107 and 151 can share one reagent dispensing mechanism retraction portion 139. Only one of the reagent suction positions 136 and 153 and one of the reagent discharge positions 137 and 154 of the reagent dispensing mechanisms 107 and 151 are shown in FIG. 12 respectively. Alternatively, a plurality of reagent suction positions 136 and 153 and a plurality of reagent discharge positions 137 and 154 may be provided.

Next, a structure of the reagent dispensing mechanism retraction portion 139 in a case where a plurality of reagent dispensing mechanisms 107 and 151 share one reagent dispensing retraction position will be described with reference to FIGS. 13(A) and 13(B).

The reagent dispensing mechanism retraction portion 139 according to the third embodiment includes the nozzle accommodation portion 142 disposed on the upper surface cover 201 of the automatic analysis device 101 and the nozzle guide accommodation portion 141 that is detachable from the upper cover 201.

FIG. 13(A) is a view showing a structure of the nozzle guide accommodation portion 141 (FIG. 13(B)) and the nozzle accommodation portion 142 (FIG. 13(A)).

In FIG. 13(B), the nozzle guide accommodation portion 141 includes two conical holes 141a used for accommodating two conical nozzle guides 140. In FIG. 13(A), a nozzle guide accommodation portion installation portion 156 having the same shape as the nozzle guide accommodation portion 141 is provided in an upper portion of the nozzle accommodation portion 142. The nozzle accommodation portion 142 has an elliptic cylindrical shape.

In this manner, the automatic analysis device 150 includes the two reagent dispensing mechanisms 107 and 151. The nozzle guide accommodation portion of the reagent dispensing mechanism retraction portion 139 includes one nozzle guide accommodation portion 141 that accommodates the nozzle guide 140 of the reagent nozzle 135 of the reagent dispensing mechanism 107 that is one of the two reagent dispensing mechanisms 107 and 151 and another nozzle guide accommodation portion 141 that accommodates the nozzle guide 140 of the reagent nozzle 135 of the reagent dispensing mechanism 151 that is the other one of the two reagent dispensing mechanisms 107 and 151. Dispensing nozzles 135 of the two reagent dispensing mechanisms 107 and 151 share the nozzle accommodation portion 142 of the reagent dispensing mechanism retraction portion 139.

FIG. 14 is a view illustrating a state where the reagent dispensing mechanisms 107 and 151 are retracted to the reagent dispensing mechanism retraction portion 139 according to the third embodiment. However, the relationship between the reagent dispensing mechanism retraction portion 139 and the upper surface cover 201 is simplified.

In FIG. 14, in order not to bring the reagent dispensing nozzles 135 of the reagent dispensing mechanisms 107 and 151 come into contact with the inner wall of the nozzle accommodation portion 142, a clearance (the clearance B) between the reagent dispensing nozzle 135 and an inner wall surface of the nozzle accommodation portion 142 is larger than a clearance (the clearance A) between an outer surface of the nozzle guide 140 and an inner wall surface of the nozzle guide accommodation portion 141 (the clearance A<the clearance B) in a state in which the reagent dispensing mechanism retraction portion 139 retracts the reagent dispensing mechanisms 107 and 151.

A clearance (a clearance E) between arms 134 of the two reagent dispensing mechanisms 107 and 151 is larger than the clearance (the clearance A) between the outer surface of the nozzle guide 140 and the inner wall surface of the nozzle guide accommodation portion 141 (the clearance A<the clearance E), so that the arms 134 can be prevented from contacting with each other.

The third embodiment describes an example of the reagent dispensing mechanisms 107 and 151 in the X-θ trajectory. Alternatively, the invention can also be applied to a reagent dispensing mechanism in an X-Y trajectory. In this case, the reagent dispensing mechanism retraction portion 139 is provided at a position where the trajectories of the two reagent dispensing mechanisms intersect with each other or at a point where starting points (ending points) of the trajectories comes into contact with each other.

The reagent dispensing mechanisms 107 and 151 according to the third embodiment include the drain tube 144, the supply flow path 146, and the like as shown in FIG. 9 according to the second embodiment. The reagent dispensing mechanisms 107 and 151 are configured such that the reagent dispensing nozzles 135 of the reagent dispensing mechanisms 107 and 151 can be cleaned.

According to the third embodiment of the invention, in addition to the same effects as in the first and second embodiments, the reagent dispensing mechanism retraction portion 139 is shared by a plurality of reagent dispensing nozzles (probes) 135, so that it is not necessary to provide a plurality of retraction portions 139 and it is possible to prevent a reduction in a degree of freedom in designing a mechanism or a unit caused by adding the retraction portion 139.

Fourth Embodiment

Next, a fourth embodiment that is a modification of the first and the second embodiments of the invention will be described.

The first and second embodiments describe configurations in which the risk of damaging the reagent dispensing nozzle 135 due to the user coming into contact with the reagent dispensing mechanism 107 is reduced, and it is easy to clean the reagent dispensing mechanism retraction portion 139.

The fourth embodiment describes a configuration in which it is easy to clean the reagent dispensing mechanism retraction portion 139 in a similar manner as in the first and second embodiments.

In the first embodiment, the reagent dispensing mechanism retraction portion 139 is detachable from the upper surface cover 201 or the drain tube 144 is connected to the reagent dispensing mechanism retraction portion 139, so that it is easy to clean the reagent dispensing mechanism retraction portion 139.

The reagent dispensing mechanism retraction portion 139 according to the fourth embodiment will be described with reference to FIG. 15. FIG. 15 is a schematic sectional view of the automatic analysis device 101 as viewed from a side of the device according to the fourth embodiment. However, the reagent dispensing mechanism retraction portion 139 and the upper surface cover 201 or the other configuration components of the automatic analysis device 101 are simplified.

As shown in FIG. 15, the reagent dispensing mechanism retraction portion 139 is divided in an upper-lower manner into a reagent dispensing mechanism retraction portion upper portion 157 and a reagent dispensing mechanism retraction portion lower portion 158. The reagent dispensing mechanism retraction portion lower portion 158 divides a lower portion of the nozzle accommodation portion 142. The reagent dispensing mechanism retraction portion upper portion 157 is integrated with or detachable from the upper surface cover 201 of the automatic analysis device 101. The reagent dispensing mechanism retraction portion lower portion 158 is independent of the reagent dispensing mechanism retraction portion upper portion 157 and is detachable from the automatic analysis device 101.

As described in the first embodiment, the outer wall of the nozzle guide accommodation portion 141 and the reagent dispensing mechanism retraction portion upper portion 157 are formed with screw threads (not shown) so that the outer wall of the nozzle guide accommodation portion 141 and the reagent dispensing mechanism retraction portion upper portion 157 can be engaged with each other. The reagent dispensing mechanism retraction portion upper portion 157 can be fixed to the automatic analysis device 101 by rotating the reagent dispensing mechanism retraction portion upper portion 157 while inserting the reagent dispensing mechanism 107 into the reagent dispensing mechanism retraction portion accommodation portion upper portion 157.

On the other hand, the reagent dispensing mechanism retraction portion lower portion 158 is disposed on a rail disposed in the automatic analysis device 101 and can be pulled out from a front surface, a rear surface, or a side surface of the automatic analysis device 101.

In addition to the same effect as in the first embodiment, the reagent dispensing mechanism retraction portion lower portion 158 can be pulled out from the automatic analysis device 101 according to the fourth embodiment. Accordingly, the fourth embodiment has an effect of easily cleaning the reagent dispensing mechanism retraction portion 139.

Fifth Embodiment

Next, a fifth embodiment that is a modification of the first embodiment will be described.

In the first embodiment, the reagent dispensing mechanism retraction portion 139 is a unit independent of the other units. The fifth embodiment describes a configuration in which the reagent dispensing mechanism retraction portion is provided in the reagent cold storage unit 104.

A method for holding the reagent containers 112 in the reagent cold storage unit 104 will be described with reference to FIG. 16. FIG. 16 is a schematic top view of the reagent cold storage unit 104 according to the fifth embodiment.

In FIG. 16, the reagent cold storage unit 104 is internally provided with a reagent disk 160 that holds the reagent containers 112 and moves the reagent containers 112 to a target position. The reagent disk 160 holds the reagent containers 112 in an aligned manner. An alignment method may be a method for radially disposing the reagent containers 112 from the center of the reagent disk 160 or may be a method for regularly holding the reagent containers 112 in the reagent disk 160.

A holding structure in which the reagent disk 160 holds the reagent containers 112 may be a structure in which the reagent containers 112 are disposed in a hole having the same shape as an outer shape of the reagent containers 112, or may be a structure in which the reagent containers 112 are fixed in the reagent disk 160 so that displacement caused by a force such as a centrifugal force does not occur when the reagent disk 160 rotates.

When the reagent containers 112 as shown in FIG. 17 whose outer shape is a quadrangular columnar shape are regularly disposed in the annular reagent disk 160, portions of holding structures that hold the reagent containers 112 are brought close to each other as shown in FIG. 16, and the other portions are not brought close to each other and a space is generated. The reagent dispensing nozzle (the probe) 135 can be retracted to the reagent cold storage unit 104 by disposing the reagent dispensing mechanism retraction portion 139 in the space.

However, the fifth embodiment is different from the first embodiment in that the reagent dispensing mechanism retraction portion 139 is divided into two constituent elements, the nozzle guide accommodation portion 141 is formed in a dispensing port 159 on the reagent disk cover 113, and the nozzle accommodation portion 142 is disposed in the reagent cold storage unit 104.

FIG. 18 is a schematic configuration view in a case where the reagent dispensing mechanism retraction portion 139 is provided in the reagent cold storage unit 104. In FIG. 18, when the reagent dispensing nozzle 135 suctions a reagent in the reagent containers 112, the reagent dispensing nozzle 135 passes through the dispensing port 159 disposed on the reagent disk cover 113 and accesses the reagent containers 112. When the reagent dispensing nozzle 135 is retracted to the reagent dispensing mechanism retraction portion 139, the reagent dispensing nozzle 135 also passes through the dispensing port 159. Therefore, the dispensing port 159 has the same structure as the nozzle guide accommodation portion 141 described in the first embodiment.

In addition, the nozzle accommodation portion 142 of the reagent dispensing mechanism retraction portion 139 disposed in the reagent cold storage unit 104 also has the same structure with the nozzle accommodation portion 142 described in the first embodiment. A relationship between a clearance (the clearance A) between the nozzle guide accommodation portion 141 and the nozzle guide 140 and a clearance (the clearance B) between the dispensing nozzle 135 and an inner wall surface of the nozzle guide accommodation portion 142 is that the clearance A<the clearance B.

Even when the reagent nozzle 135 is maximally lowered in the reagent dispensing mechanism retraction portion 139, the nozzle guide 140 comes into contact with the inner wall of the nozzle guide accommodation portion 142 and a tip of the nozzle 135 does not come into contact with a bottom surface of the nozzle accommodation portion 142. That is, a clearance (the clearance C) between the horizontal portion H of the nozzle guide accommodation portion 142 and a bottom surface portion of the nozzle guide 140 is smaller than a clearance (the clearance D) between the tip of the nozzle 135 and the bottom surface of the nozzle accommodation portion 142 (the clearance C<the clearance D).

Next, an operation flow in a case where the reagent dispensing mechanism 107 is retracted to the reagent dispensing mechanism retraction portion 139 in the reagent cold storage unit 104 will be described. FIG. 19 is an operation flowchart in the case where the reagent dispensing mechanism 107 is retracted to the reagent dispensing mechanism retraction portion 139.

In step S501 in FIG. 19, when a user requests a retraction request for the reagent dispensing mechanism 107 by displaying a button or a hard switch for maintenance on the operation portion 127, the control portion 126 receives the retraction request, the control portion 126 locks the top cover 200 by a lock portion. Then, in step S502, the mechanism of the reagent dispensing mechanism 107 is reset. In step S503, the reagent dispensing mechanism 107 is moved to a home position (for example, the reagent dispensing nozzle cleaning portion 138) that is a different position from the reagent dispensing mechanism retraction portion 139. Similar to the first embodiment, the home position may be any position where the reagent dispensing mechanism retraction portion 139 is not presented, and may be a specific position on a unit disposed on a trajectory of the reagent dispensing mechanism 107 shown in FIG. 16 or on the trajectory where no unit is presented.

In step S504, the control portion 126 drives a rotation shaft 160a of the reagent disk 160, rotates the reagent disk 160, and moves the nozzle accommodation portion 142 directly below the dispensing port 159. Then, in step S505, the reagent dispensing mechanism 107 is rotated and moved above the dispensing port 159. In step S506, the reagent dispensing mechanism 107 is lowered and stored in the nozzle guide accommodation portion 141 and the nozzle accommodation portion 142.

Thereafter, when the user completes maintenance such as cleaning the B/F separation probe 121, the user requests a retraction release request for the reagent dispensing mechanism 107 by displaying again the button or the hard switch for maintenance on the operation portion 127 and the retraction release request is received in step S507. Then, instep S508, the reagent dispensing mechanism 107 is raised above the dispensing port 159. In step S509, mechanism reset is performed and the retraction operation is ended when locking on the top cover 200 is released (mechanism reset).

The fifth embodiment of the invention has the same effect as the first embodiment. In addition, a retraction portion of the reagent dispensing mechanism 107 may be independently provided at another position other than a portion where a unit such as the reagent cold storage unit 104 or the like is disposed by providing the reagent dispensing mechanism retraction portion 139 in the reagent cold storage unit 104, and even when the another position where the reagent dispensing mechanism 107 is independently provided is not in the automatic analysis device 101 or on a trajectory of the reagent dispensing mechanism 107, the reagent dispensing mechanism 107 can be retracted. Accordingly, the retraction portion of the reagent dispensing mechanism 107 can be provided without increasing a size of the automatic analysis device 101. The retraction portion of the reagent dispensing mechanism 107 can be provided without preventing miniaturization of the automatic analysis device 101. In addition, the dispensing mechanism can be simplified.

The above-described fifth embodiment describes the reagent dispensing mechanism 107 as an example. Alternatively, the reagent stirring mechanism 108 may also include a reagent stirring mechanism retraction portion having the same configuration as the reagent dispensing mechanism retraction portion 139 in the reagent cold storage unit 104. The same effect as the retraction of the reagent dispensing mechanism 107 can also be obtained in this case.

The fifth embodiment describes an example in which the retraction operation of the reagent dispensing mechanism 107 is performed when the user cleans the automatic analysis device 101. Alternatively, the retraction operation of the reagent dispensing mechanism 107 maybe performed when a service person performs work of replacing various units.

REFERENCE SIGN LIST 101, 150 . . . automatic analysis device, 102 . . . rack, 103 . . . rack transport line, 104 . . . reagent cold storage unit, 105 . . . incubator disk, 106 . . . sample (specimen) dispensing mechanism, 106a . . . sample (specimen) dispensing nozzle, 107, 151 . . . reagent dispensing mechanism, 107t . . . arm trajectory, 108 . . . reagent stirring mechanism, 108a . . . stirrer, 109 . . . expendable item transport mechanism, 110 . . . B/F separation unit, 111 . . . detection portion unit, 112, 152 . . . reagent container, 113 . . . reagent disk cover, 114 . . . reaction container, 115 . . . reaction container disposing portion, 116 . . . dispensing tip, 117 . . . reaction container dispensing tip accommodation container, 118 . . . dispensing tip installation position, 119 . . . stirring mechanism, 120 separation portion, 121 . . . B/F separation probe, 122 . . . B/FF separation probe cleaning portion, 123 . . . B/F separation stirring portion, 124 . . . transport portion, 125 . . . reaction liquid suction nozzle, 126. . . control portion, 127 . . . operation portion, 128 . . . up and down drive motor, 129. . . mechanism shaft, 130 . . . shaft, 131 . . . up and down drive belt, 132 . . . rotation drive motor, 133 . . . rotation drive belt, 134 . . . arm, 135 . . . reagent dispensing nozzle, 136, 153 . . . reagent suction position, 137, 154 . . . reagent discharge position, 138, 155 . . . reagent dispensing nozzle cleaning portion, 139 . . . reagent dispensing mechanism retraction portion, 140 . . . nozzle guide, 141 . . . nozzle guide accommodation portion, 141a . . . conical hole, 142 . . . nozzle accommodation portion, 144 . . . drain tube, 145 . . . drain valve, 146 . . . supply flow path, 147 . . . supply flow path valve, 148 . . . cleaning bottle, 149 . . . liquid sending source, 156 . . . nozzle guide accommodation portion installation portion, 157 . . . reagent dispensing mechanism retraction portion upper portion, 158 . . . reagent dispensing mechanism retraction portion lower portion, 159 . . . dispensing port, 160 . . . reagent disk, 160a . . . rotation shaft, 161 . . . stirring paddle cleaning portion, 200 . . . top cover, 201 . . . upper surface cover

The invention claimed is:

1. An automatic analysis device comprising:
a rod-shaped member that dispenses or stirs a liquid;
a moving portion that moves the rod-shaped member;
a retraction portion into which the rod-shaped member is retracted when in a retraction position; and
control portion that controls the moving portion, wherein
the retraction position is formed with a hole to allow the rod-shaped member to be lowered downwards in a vertical direction,
when the control portion receives a retraction request for the rod-shaped member, the control portion controls the moving portion to move the rod-shaped member to the retraction position by rotational movement of the rod-shaped member to a location above the retraction portion and then lowering the rod-shaped member into the hole,
the moving portion includes an arm extending in a horizontal direction and a guide formed on a lower surface of a tip of the arm,
a guide accommodation portion and a rod-shaped member accommodation portion are formed in the hole, the guide accommodation portion accommodates the guide, the rod-shaped member communicates with an opening on a bottom of the guide accommodation portion and accommodates the rod-shaped member, and
a clearance between a side surface of the rod-shaped member and an inner wall surface of the rod-shaped member accommodation portion is larger than a clearance between a side surface of the guide and an inner wall surface of the guide accommodation portion, in a state in which the rod-shaped member is accommodated in the rod-shaped member accommodation portion.

2. The automatic analysis device according to claim 1, wherein a dimension of the hole in a vertical direction is larger than a dimension of the rod-shaped member in the vertical direction.

3. The automatic analysis device according to claim 1, wherein the retraction position is disposed on a trajectory of the rod-shaped member defined between a reagent suction position that suctions a reagent from a reagent container in a reagent holding portion, and a reagent discharge position that discharges the reagent into a reaction container in a reaction portion.

4. The automatic analysis device according to claim 1, further comprising:
a reagent holding portion that holds a reagent container; and
a reaction portion that reacts a reagent from the reagent container and a specimen in a reaction container, wherein
the rod-shaped member is a reagent dispensing nozzle for suctioning the reagent from the reagent container and discharging the reagent into the reaction container.

5. The automatic analysis device according to claim 1, further comprising:
a reaction portion that reacts a reagent and a specimen in a reaction container, wherein
the rod-shaped member is a specimen dispensing nozzle for suctioning the specimen from a specimen container and discharging the specimen into the reaction container.

6. The automatic analysis device according to claim 1, wherein the rod-shaped member is a stirring nozzle for stirring the liquid.

7. The automatic analysis device according to claim 1, wherein
the retraction portion is divided into an upper portion and a lower portion, and
the lower portion is configured to be detachable from the automatic analysis device independently of the upper portion.

8. The automatic analysis device according to claim 1, wherein
the retraction request for the rod-shaped member is performed at a time of performing maintenance on the automatic analysis device.

9. An automatic analysis device comprising:
a first rod-shaped member that dispenses or stirs a liquid;
a moving portion that moves the first rod-shaped member;
a retraction portion into which the first rod-shaped member is retracted when in a retraction position; and
a control portion that controls the moving portion, wherein
the retraction position is formed with a hole to allow the first rod-shaped member to be lowered downwards in a vertical direction,
when the control portion receives a retraction request for first the rod-shaped member, the control portion performs control to move the first rod-shaped member to the retraction position by rotational movement of the first rod-shaped member to a location above the retraction portion and then lowering the first rod-shaped member into the hole,
the moving portion includes an arm extending in a horizontal direction and a guide formed on a lower surface of a tip of the arm,
the hole includes a guide accommodation portion that accommodates the guide and a rod-shaped member accommodation portion that communicates with an opening in a bottom of the guide accommodation portion and accommodates the first rod-shaped member, and
a diameter of a bottom surface of the guide is smaller than a diameter of an upper opening of the guide accommodation portion and larger than a diameter of the opening in the bottom of the guide accommodation portion.

10. The automatic analysis device according to claim 9, wherein
in a state where the first rod-shaped member is accommodated in the rod-shaped member accommodation portion,
a clearance between a side surface of the first rod-shaped member and an inner wall surface of the rod-shaped member accommodation portion is larger than a clearance between a side surface of the guide and an inner wall surface of the guide accommodation portion, and
a clearance between a tip end of the first rod-shaped member and a bottom surface of the rod-shaped member accommodation portion is larger than a clearance between a bottom surface of the guide and a horizontal portion of the guide accommodation portion.

11. The automatic analysis device according to claim 9, further comprising:
a drain tube which is connected to a lower portion of the rod-shaped member accommodation portion and communicates with an outside portion of the automatic analysis device.

12. The automatic analysis device according to claim 11, wherein the hole has a drain valve which is disposed in the drain tube and switches between storage and discharge of a cleaning liquid in the rod-shaped member accommodation portion;

a supply flow path which is connected to a side surface of the rod-shaped member accommodation portion for supplying the cleaning liquid to the rod-shaped member accommodation portion and communicates with an inside portion of the rod-shaped member accommodation portion;

a cleaning bottle which stores the cleaning liquid;

a liquid sending source which sends the cleaning liquid to the rod-shaped member accommodation portion via the supply flow path from the cleaning bottle; and a supply flow path valve which is disposed on the supply flow path and switches between supply and stop of the cleaning liquid to the rod-shaped member accommodation portion.

13. The automatic analysis device according to claim 9, further comprising:

a second rod-shaped member, wherein the first rod-shaped member is a first reagent dispensing nozzle and the second rod-shaped member is a second reagent dispensing nozzle, and wherein the guide accommodation portion comprises a first guide accommodation portion which accommodates the guide of the first reagent dispensing nozzle and a second rod-shaped member guide accommodation portion which accommodates a guide of the second reagent dispensing nozzle.

14. The automatic analysis device according to claim 9, wherein the retraction request for the first rod-shaped member is performed at a time of performing maintenance on the automatic analysis device.

* * * * *